United States Patent [19]
Williams

[11] Patent Number: 5,606,575
[45] Date of Patent: Feb. 25, 1997

[54] FFT-BASED CHANNELIZER AND COMBINER EMPLOYING RESIDUE-ADDER-IMPLEMENTED PHASE ADVANCE

[75] Inventor: Terry L. Williams, Melbourne Beach, Fla.

[73] Assignee: AirNet Communications Corporation, Melbourne, Fla.

[21] Appl. No.: 595,106

[22] Filed: Feb. 1, 1996

Related U.S. Application Data

[63] Continuation of Ser. No. 146,364, Oct. 29, 1993, Pat. No. 5,535,240.

[51] Int. Cl.$^6$ .............................. H04B 1/38; H04L 5/16
[52] U.S. Cl. ...................... 375/219; 375/260; 375/295; 375/316; 370/484
[58] Field of Search ................................ 375/219, 259, 375/260, 295, 302, 316, 322, 324, 340; 370/18, 23, 70; 379/58, 59; 455/33.1

[56] References Cited

U.S. PATENT DOCUMENTS

| | | |
|---|---|---|
| 4,199,660 | 4/1980 | Dill et al. . |
| 4,312,062 | 1/1982 | Bellanger et al. . |
| 4,316,282 | 2/1982 | Macina . |
| 4,393,456 | 7/1983 | Marshall, Jr. . |
| 4,510,598 | 4/1985 | Gockler et al. . |
| 4,623,980 | 11/1986 | Vary . |
| 4,754,449 | 6/1988 | Crookshanks . |

(List continued on next page.)

FOREIGN PATENT DOCUMENTS

| | | |
|---|---|---|
| 0189822A2 | 8/1986 | European Pat. Off. . |
| 0497083A1 | 8/1992 | European Pat. Off. . |
| 0501690A2 | 9/1992 | European Pat. Off. . |
| 0549451A1 | 6/1993 | European Pat. Off. . |
| 0590412A1 | 4/1994 | European Pat. Off. . |
| WO9410772 | 5/1994 | WIPO . |

OTHER PUBLICATIONS

Bonnerot, et al., "Digital Processing Techniques inn the 60 Channel Transmultiplexer," IEEE Transactions on Communications vol. COM–26, May 1978, pp. 698–706.

Bellanger, et al., "TDM–FDM Transmultiplexer: Digital Polyphase and FFT," IEEE Transactions on Communications, vol. COM–22, Sep. 1974, pp. 1199–1205.

Bakhru, "Multi–Channel Digital Sonobouy Receiver," in MILCOM 90: IEEE Military Communications Conference Record, (New York: Institute of Electrical and Electronic Engineers, 1990), vol. 3, pp. 1250–1255.

Chester, et al., "VLSI Implementation of a Wide Band, High Dynamic Range Digital Drop Receiver," IEEE Proceedings of ICASSP 91, May 14–17, 1991.

(List continued on next page.)

*Primary Examiner*—Stephen Chin
*Assistant Examiner*—Don Vo
*Attorney, Agent, or Firm*—Cesari and McKenna

[57] ABSTRACT

In a cellular-telephone-system base-station receiver's channelizer (111), frequency translation of the outputs of a filter bank (FIG. 5) implemented in fast-Fourier-transform circuitry (453,455,460) is achieved by rotating the correspondence between FFT input elements and the filter coefficients by which multipliers (437) multiply incoming samples to produce them. Specifically, a storage-address generator (482) directs that corresponding FFT input elements of successive FFT operations be stored in the same locations in an input-data memory (451). To retrieve those values for use in the DFT operation, however, a fetch-address generator (484) employs a modulo-K adder (488) to impose a changing offset so that the starting address for retrieval of each FFT operation's input record changes between FFT operations by the filter bank's decimation rate M. An FFT-implemented combiner (131) similarly rotates computation values to phase align successive wavelets that it adds together to generate modulated carriers in a multi-channel output signal.

24 Claims, 20 Drawing Sheets

U.S. PATENT DOCUMENTS

| | | |
|---|---|---|
| 4,785,447 | 11/1988 | Ichiyoshi . |
| 4,792,943 | 12/1988 | Gockler . |
| 4,881,191 | 11/1989 | Morton . |
| 4,933,954 | 6/1990 | Petry . |
| 5,117,501 | 5/1992 | Childress et al. . |
| 5,203,015 | 4/1993 | George . |
| 5,239,538 | 8/1993 | Teel, Jr. et al. . |
| 5,247,702 | 9/1993 | Su et al. . |
| 5,274,842 | 12/1993 | Sasuta . |
| 5,276,442 | 1/1994 | Cree et al. . |
| 5,289,464 | 2/1994 | Wang . |
| 5,299,192 | 3/1994 | Guo et al. . |
| 5,323,391 | 6/1994 | Harrison . |
| 5,323,446 | 6/1994 | Kojima et al. . |
| 5,535,240 | 7/1996 | Carney et al. .......................... 375/260 |
| 5,537,435 | 7/1996 | Carney et al. .......................... 375/260 |

OTHER PUBLICATIONS

Olmstead et al., "A Digital Tuner for Wideband Receivers," DSP Applications Magazine, Sep. 1992.

Hanoui et al., "An All Digital Timing Recovery Scheme for Voice Band Data Modems," IEEE International Conference on Acoustics, Speech and Signal Processing, 1987, pp. 1911–1914.

Armstrong, et al., "Symbol Synchronization Using Single Samples and Interpolation," IEEE Transactions on Communications, vol. 41, No. 2, Feb. 1993, pp. 318–321.

Gardner, F. M., "Interpolation in Digital Modems–Part I: Fundamentals," IEEE Transactions on Communications, vo. 41, No. 3, Mar., 1993.

Gardner, et al., "Interpolation in Digital Modems–Part II: Implementation and Performance," IEEE Transactions on Communications, vol. 41, No. 6, Jun., 1993, pp. 998–1008.

Ho, Kelvin, "Architectural Design of a Code Division Multiple Access Cellular System," Vehicular Technology Society, 10 May 1992–13 May 1992, Denver, U.S., pp. 47–50.

Behague et al., "Modularity and Flexibility: The Keys to Base Station System Configuration for the GSM Network," Mobile Radio Conf., Nov. 13, 1991–Nov. 15, 1991, Valbonne, France, pp. 161–168.

Crochiere, Ronald E. and Rabiner, Lawrence R., "Multirate Digital Signal Processing," Prentice–Hall, Inc., Englewood Cliffs, NJ, pp. 296–317.

Crochiere, Ronald E., "A Weighted Overlap–Add Method of Short–Time Fourier Analysis/Synthesis," IEEE Transactions on Acoustics, Speech, and Signal Processing, vol. ASSP–28, No. 1, Feb., 1980, pp. 99–102.

Portnoff, Michael R., "Time–Frequency Representation of Digital Signals and Systems Based on Short–Time Fourier Analysis," IEEE Transactions on Acoustics, Speech, and Signal Processing, vol. ASSP–28, No. 1, Feb. 1980, pp. 55–69.

Allen, Jont B., "Short term Spectral Analysis, Synthesis, and Modification by Discrete Fourier Transform," IEEE Transactions on Acoustics, Speech and Signal Processing, vol. ASSP–25, No. 3, Jun., 1977, pp. 235–237.

Allen, Jont B. and Rabiner, Lawrence B., "A Unified Approach to Short–Time Fourier Analysis and Synthesis," Proceedings of IEEE, vol. 65, No. 11, Nov., 1977, pp. 1558–1564.

Schafer, R. W., Rabiner, L. R., Herrmann, O., "FIR Digital Filter Banks for Speech Analysis," The Bell Technical Journal, vol. 54, No. 3, Mar., 1975, pp. 531–544.

Schafer, Ronald W. and Rabiner, Lawrence R., "Design and Simulation of a Speech Analysis–Synthesis System Based on Short–Time Fourier Analysis," IEEE Transactions on Audio and Electroacoustics, vol. AU21, No. 3, Jun., 1973, pp. 165–174.

IEE Colloquium on "Communications Simulation and Modelling Techniques," Sep. 18, 1993, Digest No. 1993/139.

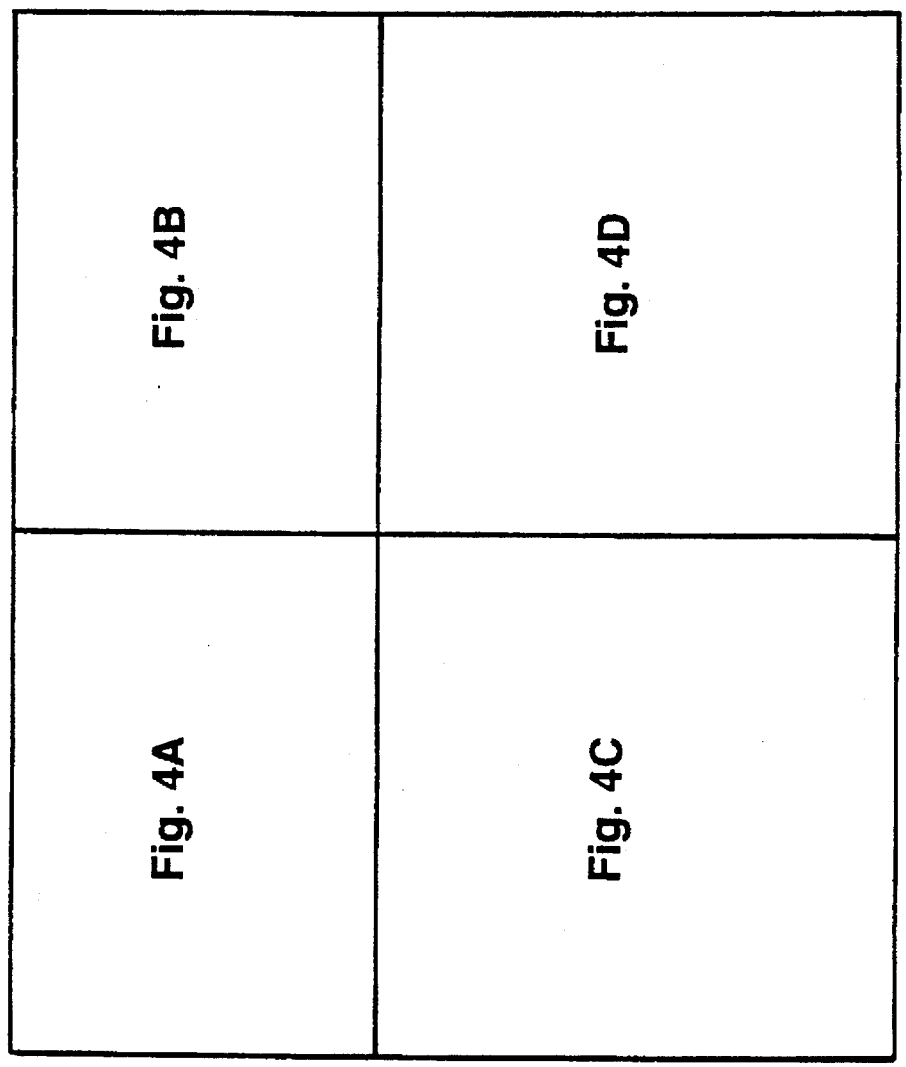

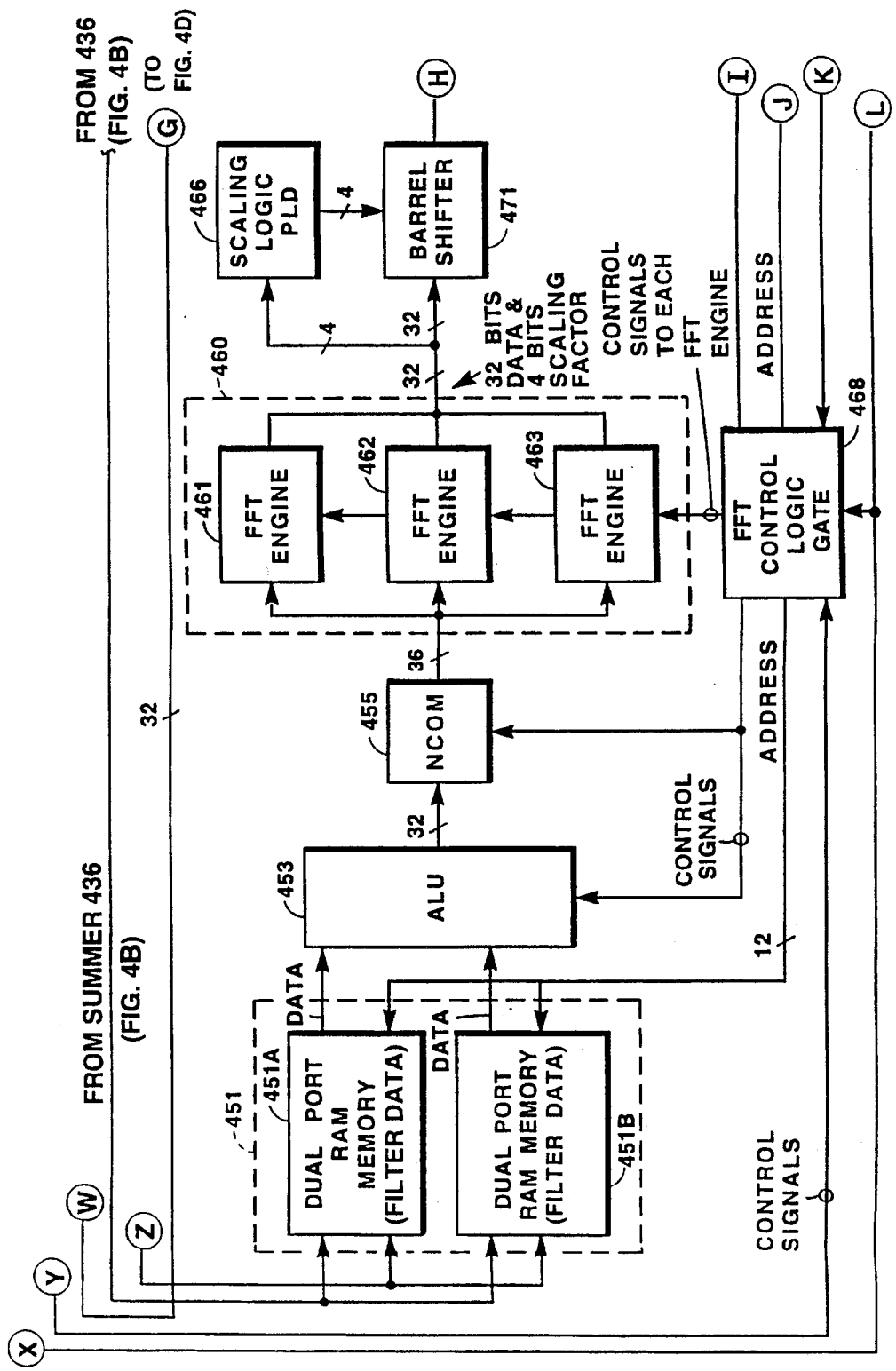

FFT-BASED CHANNELIZER AND COMBINER EMPLOYING RESIDUE-ADDER-IMPLEMENTED PHASE ADVANCE

FIELD OF THE INVENTION

This is a continuation of U.S. patent application Ser. No. 08/146,364, filed Oct. 29, 1993, now U.S. Pat. No. 5,555, 240, by Carney et al. for a Transceiver Apparatus Employing Wideband FFT Channelizer and Inverse FFT Combiner for Multichannel Communication Network. The present invention relates in general to wireless communication networks such as cellular networks and personal communication systems (PCS) and is particularly directed to providing a practical implementation of individual-channel phase advance in a wideband, Fast-Fourier-transform-based (FFT) channelizer or combiner.

BACKGROUND OF THE INVENTION

In order to provide multi-channel voice/data communications over a broad geographical area, wireless- (e.g., cellular-) communication service providers currently install transceiver base stations in protected an maintainable facilities (e.g., buildings). Because of the substantial amount of hardware currently employed to implement the signal processing equipment for a single cellular channel, each base-station is typically configured to provide multichannel communiation capability for only a limited portion of the frequency spectrum that is available to the service provider. A typical base-station may contain three to five racks of equipment, which house multiple sets of discrete receiver and transmitter signal-processing components in order to service a prescribed portion (e.g., 48) of the total number (e.g., 12 MHz) bandwidth.

The receiver section of a typical one of a base station's plurality (e.g., 48) of narrowband (30 kHz) channel units is diagrammatically illustrated in FIG. 1 as comprising a dedicated set of signal processing components, including a front end, down-conversion section 10, an intermediate frequency (IF) section 20, and a baseband section 30. Frontend section 10 comprises a low-noise amplifier 11 to which the transceiver site's antenna is coupled, a radio-frequency-to-intermediate-frequency (RF-IF) down-converting mixer 13, and an associated IF local oscillator 15. IF section 20 comprises a bandpass filter 21 that receives the mixer-13 output, an amplifier 23, an IF-baseband mixer 25, and an associated baseband local oscillator 27. Bandpass filter 21 may have a bandwidth of 100 KHz centered at a respective one of the four hundred 30 KHz sub-portions of a 12-MHz-wide cellular voice/data communication band, diagrammatically illustrated in the multi-channel spectral distribution plot of FIG. 2.

Baseband section 30 contains a lowpass (anti-aliasing) filter 31, an analog-to-digital (A-D) converter 33, a digital (demodulator/error correction) processing unit 35, and an associated telephony (e.g., T1 carrier) unit 37 through which the processed channel signals are coupled to attendant telephony-system equipment. The sampling rate of the A-D converter 33 is typically on the order of 75 kilosamples/sec. The narrowband channel signal as digitized by A-D converter 33 is demodulated by processing unit 35 to recover the embedded voice/data signal for application to telephony carrier unit 37. (A similar dedicated signal processing transmitter section, complementary to the receiver section, is coupled to receive a digital feed from the telephony system equipment and output an up-converted RF signal to the transceiver site's antenna.)

To optimize service coverage within the entire bandwidth (e.g., 10–12 MHz) available to the service provider and to ensure non-interfering coverage among dispersed transceiver sites at which the base stations are located, the transceiver sites in a typical urban service area customarily are geographically distributed in mutually contiguous hex-cells (arranged in a seven-cell set). Each cell has its own limited-capacity multi-rack base station that serves a different respective subset of the available (400) channels. Over a broad geographical area, the frequency allocation within respective cells and the separation between adjacent cell sets may be prescribed to prevent interference among network channels.

Every channel has components spread over multiple equipment racks in a typical channel receiver section of the type described above with reference to FIG. 1, so the cost and labor involved in geographically situating, installing, and maintaining such equipment are substantial. The service provider would therefrom benefit from equipment that is more flexible both in terms of where it can be located and in terms of the particular channels that a given transceiver site can cover. This is particularly true in non-urban areas, where desired cellular coverage may be concentrated along a highway, for which the limited capacity of a conventional 48-channel transceiver site would be inadequate, and where a relatively large, secure, and protective structure for the multiple racks of equipment required may not be readily available.

SUMMARY OF THE INVENTION

The present invention contributes to making the service provider's transceiver substantially more compact than the equipment in which conventional transceiver designs are embodied, so the transceiver does not require the relatively large, protected structure that the multiple equipment racks of previous designs necessitate. Moreover, the invention can be embodied in equipment that is more flexible in terms of the particular channels that a given transceiver site can handle.

A receiver that employs the teachings of the present invention includes a channelizer that receives a wide input spectrum containing a large number of frequency-division-multiplexed signals. The channelizer separates the thus-multiplexed signals in a relatively small amount of hardware by taking advantage of fast-Fourier-transform techniques to implement a bank of filters that act to separate the constituent signals.

Such a filter bank is based on the theory that the impulse response, or finite-impulse-response-filter coefficients, of each filter in such a bank can consist simply of a respective complex-sinusoidal sequence weighted by corresponding impulse-response values of a base (typically low-pass) filter that has the desired bandwidth.

Now, since a Fourier transformation by definition multi-plies a sequence of input values by various complex-sinu-soidal sequences, a channelizer can be implemented by sampling the wideband signal, weighting segments of it by coefficients of the base filter, and subjecting each such weighted input-sequence segment to a discrete Fourier transformation.

The fact that a discrete Fourier transformation can be employed is advantageous because use of fast-Fourier-transform techniques can greatly limit the computational complexity of such a filter bank. As is well known, fast-Fourier-transform techniques reduce the computational cost that would otherwise attend the calculation of large-record discrete Fourier transforms. They do this by performing the computations in successive passes in which respective passes' computation values are subjected to series of constituent, smaller discrete Fourier transformations. If implemented as described so far, i.e., simply as a bank of bandpass filters, the channelizer output would not be in the form normally required, i.e., in the form of a plurality of baseband signals. Instead, it would be respective frequency bins' center frequencies modulated by those baseband signals. While it has been recognized theoretically that the baseband signals could be recovered by appropriate shifting of the DFT input-record values, the present invention provides a practical way of achieving the requisite shifting.

The present invention achieves the requisite shifting by employing a novel approach to addressing the memory that stores the computation values used in the transform operation. Specifically, the circuitry used to generate addresses for storing or fetching one FFT pass's computation values—i.e., its operands or results—employs a modulo-$K'$ adder to add an offset value to address values that would produce no such shifting. Here $K'=JK$, J is a positive integer, and K is the overall-FFT size. Typically, the offset value added by the modulo-$K'$ adder is a value that progresses by the decimation rate M between overall-FFT operations. That is, the offset value typically is incremented by M or decremented by M. It will also be typical for $K'$ to equal K, i.e., for the adder's modulus to be the same as the overall-FFT size, although a different arrangement will additionally be described below.

In accordance with another aspect of the invention, the same modulo-$K'$ addition can also be employed beneficially in a transmitter's combiner, i.e., in an apparatus for modulating individual carrier frequencies with corresponding baseband channel signals and combining the result into a composite wideband signal.

To contain the information in all of the channels, the composite digital signal ultimately converted to analog form for radio-frequency translation and application to the transmitting antenna must comprise samples that occur at a relatively high rate. In contrast, each channel contains only a small portion of the total information to be transmitted, and the samples representing the information in one channel occur at a rate that is only 1/M of the composite sample rate. To increase the sample rate as well as modulate respective carriers, the combiner treats each channel's carrier as the sum of overlapping high-rate finite-duration sequences, each of which is the carrier modulated by a differently time-offset (finite-duration) interpolation function. (Although I call such sequences wavelets below for the sake of convenience, they are not to be confused with the correspondingly named functions in the wavelet transform, to which they bear little relationship.) The combiner weights such "wavelet" sequences by respective channel samples and produces a multifrequency wavelet by adding together the wavelets resulting from the same-time samples in the several channels. The combiner output is the result of stringing the resultant (overlapping) multifrequency wavelets together.

Since an inverse discrete Fourier transform is a sum of different-frequency complex-sinusoidal sequences whose magnitudes and phases are set by respective ones of the inverse transform's input elements, a multifrequency wavelet can be produced by applying the wavelet envelope to the periodically extended output sequence of an inverse-discrete-Fourier-transformation operation whose input consists of one sample from each channel. The transmitter of the present invention produces successive multi-frequency wavelets in this way and adds them together with an M-element offset.

But the individual wavelets, before (complex) weighting, must be so related in phase that they would add to a continuous carrier if they were not weighted. And this relationship does not ordinarily result when the multifrequency wavelets thus produced are added together with an M-element offset; the proper phase relationship results only if the combiner output interpolation rate M is an integer multiple of the inverse-discrete-Fourier-transform size K, as it normally is not.

The necessary phase alignment could be achieved by multiplying channel sequences by corresponding complex-sinusoidal sequences, and it has been recognized theoretically that the same effect can be achieved by an appropriate shift in inverse-DFT output elements. As will be explained below, address generation by the modulo-$K'$-adder approach described above is a practical way to perform this shifting.

BRIEF DESCRIPTION OF THE DRAWINGS

These and further features and advantages of the present invention are described in the accompanying drawings, in which:

FIGS. 4, 4A, 4B, 4C, and 4D diagrammatically illustrate the configuration of an overlap-and-add channelizer that may be employed in the transceiver apparatus of FIG. 3 in accordance with the present invention;

DETAILED DESCRIPTION OF AN ILLUSTRATIVE EMBODIMENT

So as not to obscure the disclosure with structural details that those skilled in the art can readily infer from the description, the drawings represent conventional circuits and components by readily understandable block diagrams that show only details specific to the present invention. The block-diagram illustrations therefore do not necessarily represent the mechanical structural arrangement of the exemplary system.

Figure 3:
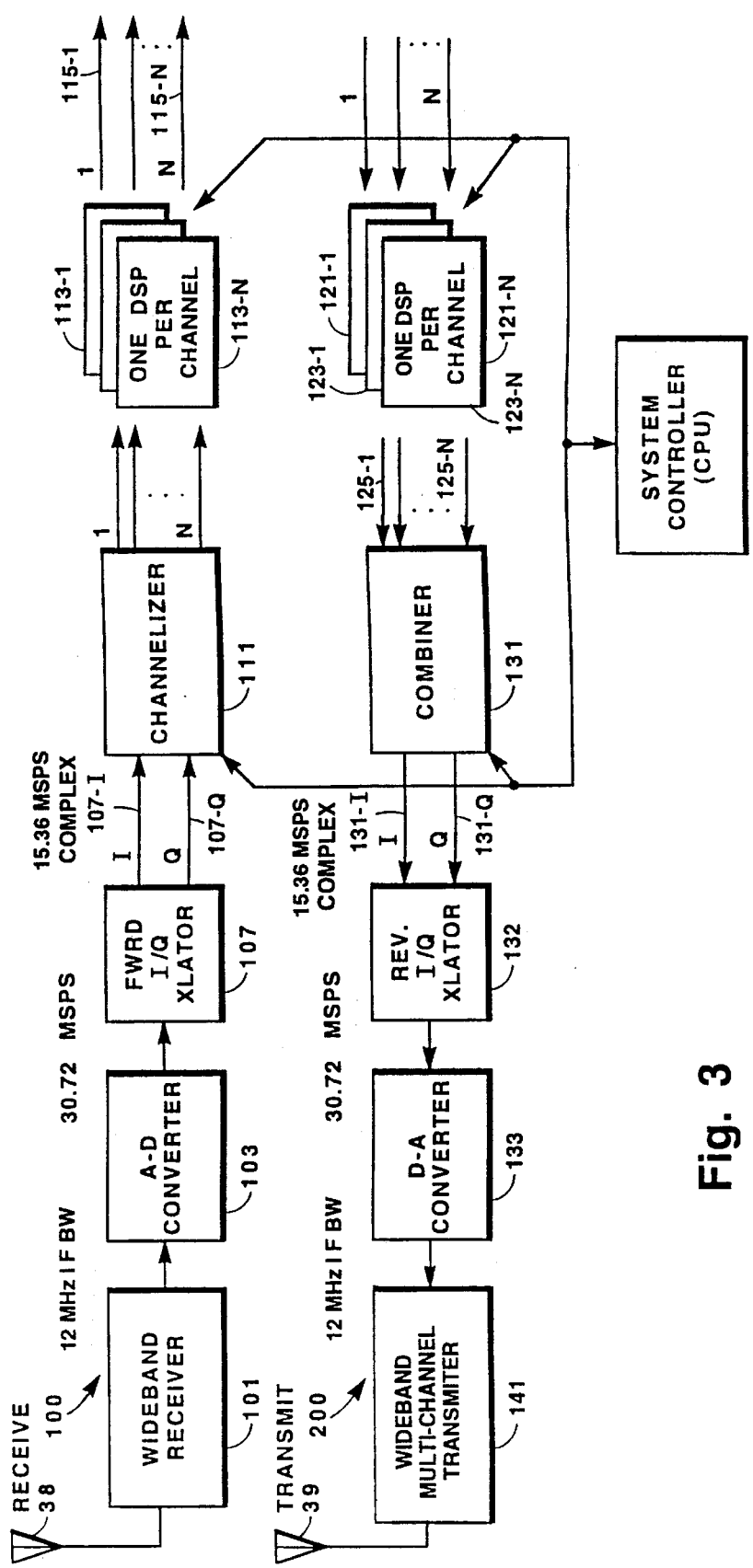
FIG. 3 diagrammatically illustrates a wideband multi-channel transceiver apparatus in accordance with the present invention.

FIG. 3 diagrammatically illustrates the transceiver apparatus of the present invention as comprising a receiver section 100 and a transmitter section 200. Receiver section 100 includes an antenna 38 coupled to a wideband receiver 101 capable of receiving any of the channels that the communications-service provider supports. As a non-limitative example, wideband receiver 101 may comprise a WJ-9104 receiver, manufactured by Watkins-Johnson Company, 700 Quince Orchard Road, Gaithersburg, Md., 20878-1794.

The spectrum of interest may be that described previously, e.g., a 12-MHz band comprising four hundred 30-KHz channels, but the present invention is not limited to this range.

The output of wideband receiver 101 is a down-converted, multi-channel (baseband) signal containing the contents of all of the (30-KHz) voice/data channels currently operative in the communication system or network of interest. This multichannel baseband signal is coupled to a high-speed A-D converter 103, such as a Model AD9032 A-D converter manufactured by Analog Devices, One Technology Way, Norwood, Mass., 02062-9106. Such A-D converters' dynamic ranges and sampling-rate capabilities are high enough (e.g., the sampling rate may on the order of 25 megasamples/sec.) to enable downstream digital components, including the digital discrete-Fourier-transform (DFT) channelizer 111, to process signals within any of the four hundred 30-kHz system channels. Channelizer 111, which will be described below, applies their separate channel signals to respective digital signal processors 113, which apply their contents to the telephone network by a T1 carrier digital interface or other means.

Figure 1:
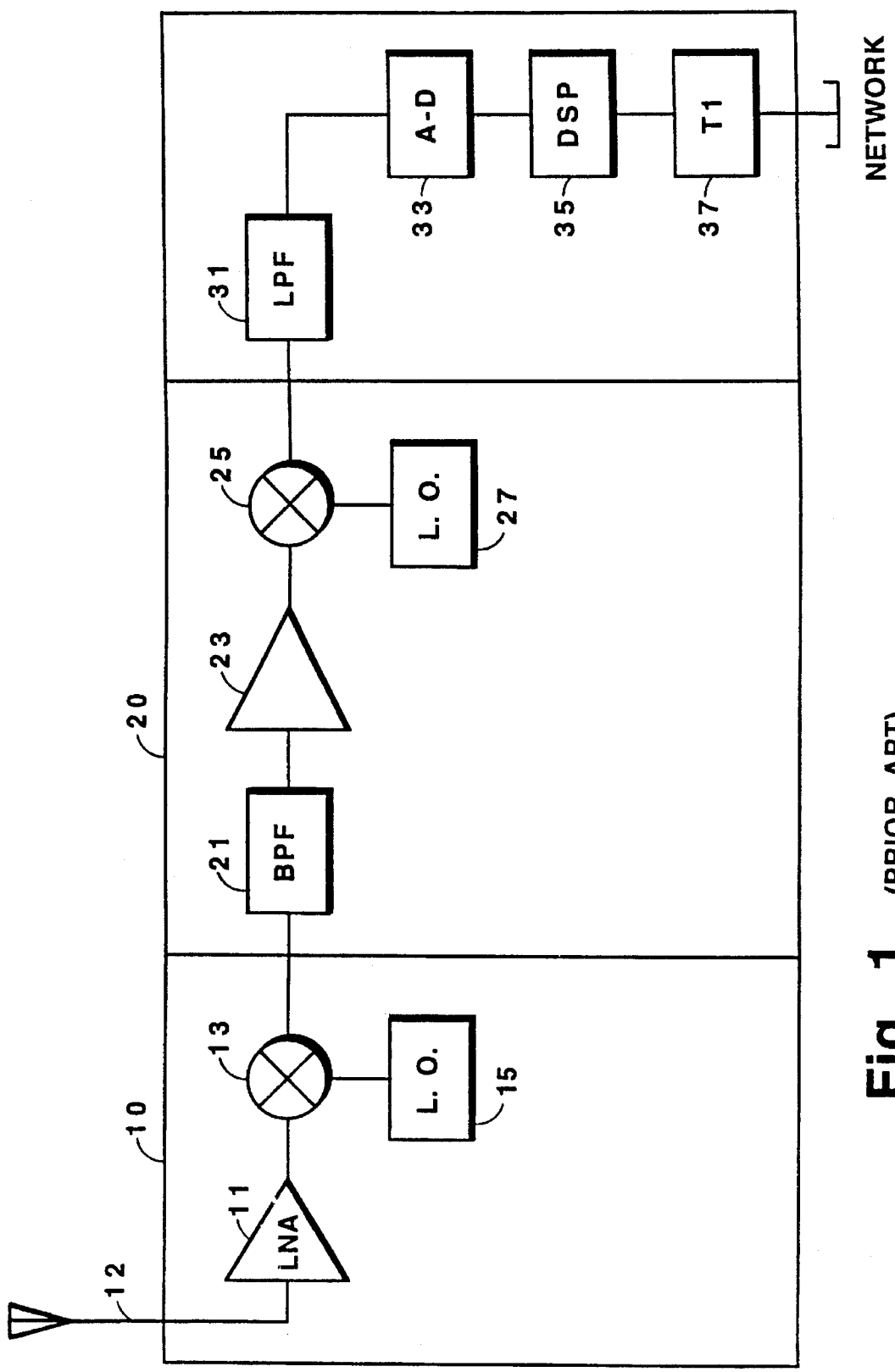
FIG. 1 diagrammatically illustrates the receiver section of a conventional cellular-communication base-station channel unit.

A digital in-phase/quadrature (I/Q) translator 107 converts the A-D converter 103's 30.72 megasample/sec real sequence to a 15.36 megasample/second complex sequence that the fast Fourier transform (FFT) channelizer 111 receives by way of I and Q links 107I and 107Q. From this wideband multichannel signal, the FFT channelizer extracts respective narrowband channel signals, each of which represents the contents of respective (30-kHz) communication channels within the wideband receiver's spectrum. The respective digital receiver processing units 113-1 . . . 113-N demodulate those signals and perform any required error-correction processing, just as in the conventional transceiver unit of FIG. 1, before transmitting the results to the telephone network. Each of digital receiver processing units 113 may comprise a Texas Instruments TMS320C50 digital signal processor, manufactured by Texas Instruments (Post Office Box 655303, Dallas, Tex., 75265).

TMS320C50's can also be used for digital-signal-processing ("DSP") units 121-1 . . . 121-N in the transmitter section 200. These units receive respective digital voice/data communication signals, modulate them, perform pretransmission error correction, and supply the results at respective output ports 123-1 . . . 123-N.

From output ports 123-1 . . . 123-N, the narrowband channel signals are coupled over channel links 125-1 . . . 125-N to respective input ports of an inverse-FFT-based multichannel combiner unit 131, to be described below. The combiner's wideband output is the sum of different carriers modulated by outputs of respective processing units 121. An I/Q translator unit 132 receives in-phase and quadrature signal components of the combiner 131's complex output on respective links 131I and 131Q and provides a real-valued output signal to a digital-to-analog (D-A) converter 133. Digital-to-analog (D-A) converter 133 preferably comprises a commercially available unit, such as an Analog Device model AD9712A D-A converter. A wideband (multichannel) transmitter unit 141 frequency translates the D-A output and applies the result to an antenna 39 for transmission.

As will be explained below, the wideband channelizer 111 and the wideband combiner 131 both employ convolutional-decimation spectral-analysis techniques to provide the broad coverage required of a full-spectrum cellular-transceiver site, and this approach reduces the amount of hardware required for that purpose. As will be further demonstrated, the present invention contributes to the significant transceiver-site complexity reduction that this approach affords.

The channelizer implementation of FIG. 4 provides full programmable control of the system parameters by way of a standard VMEbus interface, and channelized data distribution over a custom, time-division-multiplexed (TDM) data bus described in U.S. patent application Ser. No. 08/497,732, filed on Feb. 26, 1995, by Ronald R. Carney et al. for a Wideband Wireless Base-Station Making Use of Time Division Multiple-Access Bus to Effect Switchable Connections to Modulator/Demodulator Resources. For purposes of providing a non-limiting illustrative example, we describe a 400-channel, 30-kHz system. Such an arrangement can be employed in a North American Digital Cellular (NADC) system, as defined by the Electronics Industries Association and Telecommunications Industry Association standard TIA/EIA IS-54. We also describe a fifty-channel, 200-kHz system, which can be employed with the Pan-European Groupe Speciale Mobile (GSM) cellular standard. A sample rate of 50 kHz is assumed for the 400-channel, 30-kHz channel system. For the 200-kHz system, a 300-kHz sample rate is assumed. The channelizer output data takes the form of analytic baseband signals, and the channel sample rates will depend upon the channelizer's filter design, as will be described.

As pointed out above, the raw data upon which the channelizer is to operate is derived from wideband receiver 101 (FIG. 3). The sampling rate of the receiver's associated A-D converter 103 is controlled by a sample-rate clock signal supplied over link 401 (FIG. 4A) from a buffer/driver interface 403 under the control of a control unit 405. Control unit 405 preferably comprises a set of combinational logic and flip-flops that are driven by associated clock sources 407 so as to implement a state-machine sequence-control function to be described. The input sampling clock rate is determined by the number of channels being received and the bandwidth of the received channels.

Clock signals for the coefficient multiplier, FFT processor, and output TDM bus, described below, are derived from a high-rate (e.g., 200-MHz) reference oscillator 412 and associated down counters 414 and 416.

Since the channelizer 111 is FFT-based, with FFT frequency bins corresponding to channels, the total number of channels is preferably a power of two. Due to characteristics of the wideband receiver's anti-aliasing filter, channels that are near to the edges of the band are typically not useful. In order to process four hundred 30-kHz channels, the FFT channelizer must be at least a 512-point processor if the number of bins is to be a power of two. Processing fifty 200-kHz channels similarly requires a 64-point FFT processor.

In the present example, clock unit 407 may contain oscillators 407-1 and 407-2 respectively dedicated to one of these sampling rates. During initialization, a system controller such as a CPU (not shown) attached to a system VMEbus 410 determines which oscillator is employed.

For 30-kHz channels, a 512-point FFT channelizer covers a bandwidth of 15.36 MHz, while four hundred 30-kHz channels cover 12 MHz. The receiver centers the 400 30-kHz channels in the middle of the 15.36-MHz band, thereby providing 1.68 MHz (56 channels' worth) of guard bands on both ends to allow for aliasing. Similarly, for 200-kHz channels, a 64-point FFT channelizer covers a bandwidth of 12.8 MHz. Centering fifty channels within this band leaves seven channels, or 1.4 MHz, of guard-band spacing on both ends.

The digitized data samples produced by the receiver's high-speed A-D converter are sequentially clocked over link 411 through buffer/driver interface 403, and control signals on bidirectional link 415 from controller 405 control their loading into a rate-buffer FIFO (first-in, first-out) memory 413. As the data are fed to the rate-buffer FIFO, each sample's two most significant bits are monitored by logic circuitry 416, which serves as an amplitude monitor unit to provide gain control and thereby ensure utilization of the A-D converter's full dynamic range. Specifically, unit 416's output controls an attenuator (not shown) upstream of the A-D converter.

When the FIFO rate buffer 413 contains a block of 2M samples, it signals the control unit 405 to begin processing that data block. These 2M samples are then clocked out of the FIFO 413 over line 417 to a half-band filter 419 in bursts at a rate higher than the input-sample clock rate in order to accommodate the size of the FFT processor, as will be explained in detail below.

Figure 2:
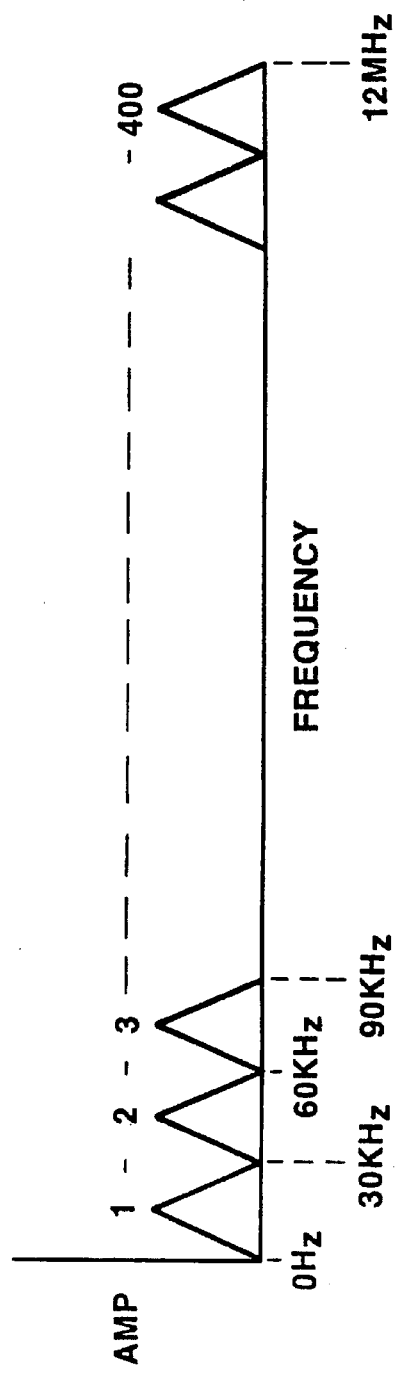
FIG. 2 is a multi-channel spectral-distribution plot of four hundred 30-KHz subportions of a 12-MHz-wide voice/data communication band.

Half-band filter 419 performs the real-to-complex input-data conversion that FIG. 2's block 107 represents, reducing the number of samples by a factor of two in the process and thereby dividing the clock rate in half. These complex data values are clocked over link 421 to a shift register 422 employed within a multiplication circuit 420 for performing an overlap-and-add filter's coefficient multiplications and overlapping. Circuit 420 performs these operations for a filter that has a cutoff frequency of one-half of the channel bandwidth. The number of filter coefficients is 4K in the illustrated embodiment.

The elements of FIGS. 4A, 4B, 4C, and 4D of most interest in connection with the present invention are (1) the filter-coefficient-multiplication circuit 420, (2) a data-transfer circuit comprising a dual-port memory 451 (FIG. 4C) and circuitry for addressing it, and (3) a fast-Fourier-transform ("FFT") circuit comprising a radix-2 section 453 and 455 and a radix-4 section 460. The data-transfer circuit receives the output of the filter-coefficient-multiplication circuit and applies it to the FFT circuit in a manner that will be described below.

This combination of elements performs three major functions. First, it realizes a bank of bandpass filters that extract respective frequency bands from the wideband input signal, i.e., from the halfband filter 419's output. Second, it decimates the bandpass filters' (conceptual) output sequences in recognition of their respective narrowed frequency bands. Third, it frequency translates the (conceptual) bandpass-filter outputs to baseband. The theoretical basis of such filter banks is known in the art, as evidenced by Chapter 7 of *Multirate Digital Signal Processing* by R. E. Crochiere et al., published by Prentice-Hall, Inc. Consequently, it will be touched on here only briefly.

Figure 5A:
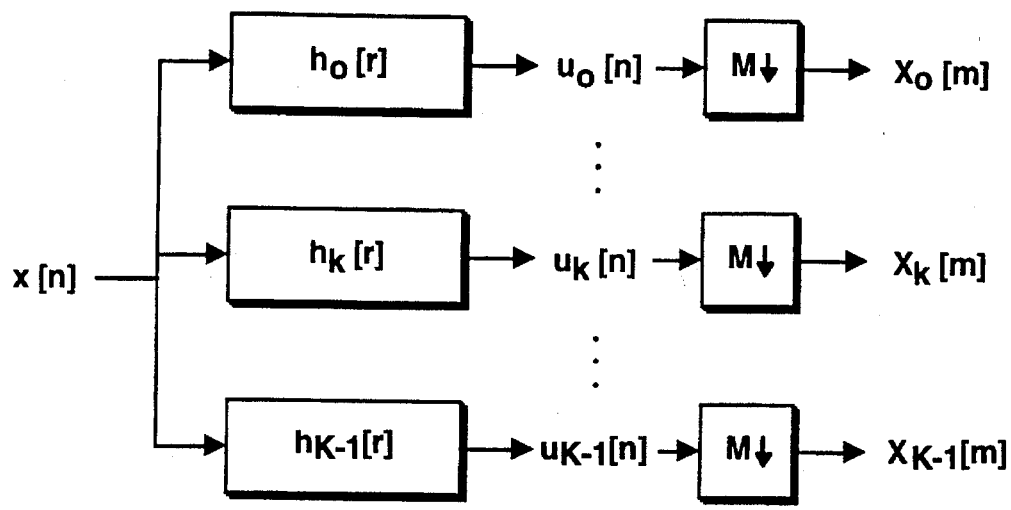
FIGS. 5A and 5B are conceptual diagrams of filter banks respectively implemented is by the channelizer and a combiner to be described below.

FIG. 5A depicts the bandpass-filter effect conceptually. Suppose that K bandpass filters' frequency responses are identical except for a uniform frequency offset, i.e., that the impulse response of each filter can be thought of as a base impulse response h[r] modulated by a complex sinusoid whose phase advance per input-sequence sample is a different integer multiple of $2\pi/K$:

$$h_k[r]=h[r]e^{j2\pi kr/K}$$

Each bandpass filter convolves the half-band filter 419's wideband output sequence x[n] with a respective impulse response to produce a respective bandlimited output $u_k[n]$:

$$u_k[n] = \sum_{r=-\infty}^{\infty} h_k[r]W_K^{kr}x[n-r],$$

where $W_K = e^{j2\pi/K}$.

Now, if the filter output is decimated by M<K, i.e., if the filter outputs are computed only for every Mth input sample to produce an output sequence $X_k[m]=u_k[mM]$ for the kth filter, then the carrier frequencies will be aliased, but none of the information in a given filter output $u_k[n]$ will be lost or corrupted by the aliasing if none of the K filters' bandwidths exceeds 1/K of the input-signal bandwidth.

Moreover, much of the computation can often be performed by a discrete Fourier transform, and thus potentially by fast-Fourier-transform ("FFT") circuitry. To see this, let us suppose for the sake of concreteness that the filters are finite-impulse-response filters of length $N_h$ and that $N_h$ is an integer multiple d of a convenient FFT-input-record length K. For further concreteness, let us set J=4. Then an $N_h$-element filter input record can be divided into four K-element subsequences, and the kth filter-bank output, which equals the convolution of that four-subsequence record with the filter impulse response, can be obtained by computing the sum of the four sequences' respective kth DFT elements:

$$X_k[m] = \sum_{j=-2}^{1} \sum_{s=0}^{K-1} x[mM+lK+s]h[-lK-s]W_K^{ks},$$

where we have arbitrarily assumed that a base filter impulse response h[r] extends from r=-2K to 2K-1. Reversing the order of summation shows that the filter bank can be implemented more economically by using a single DFT circuit in which each input-record element is the sum of the results of multiplying corresponding members of the K-element subsequences by respective filter coefficients:

$$X_k[m] = \sum_{s=0}^{K-1} \left( \sum_{j=-2}^{1} x[mM+lK+s]h[-lK-s] \right) W_K^{ks}.$$

Letting $y_m[s]$ represent the inner summation, corresponding to the input elements of the DFT, makes the form of the DFT apparent:

$$X_k[m] = \sum_{s=0}^{K-1} y_m[s]W_K^{ks}$$

Figure 6:
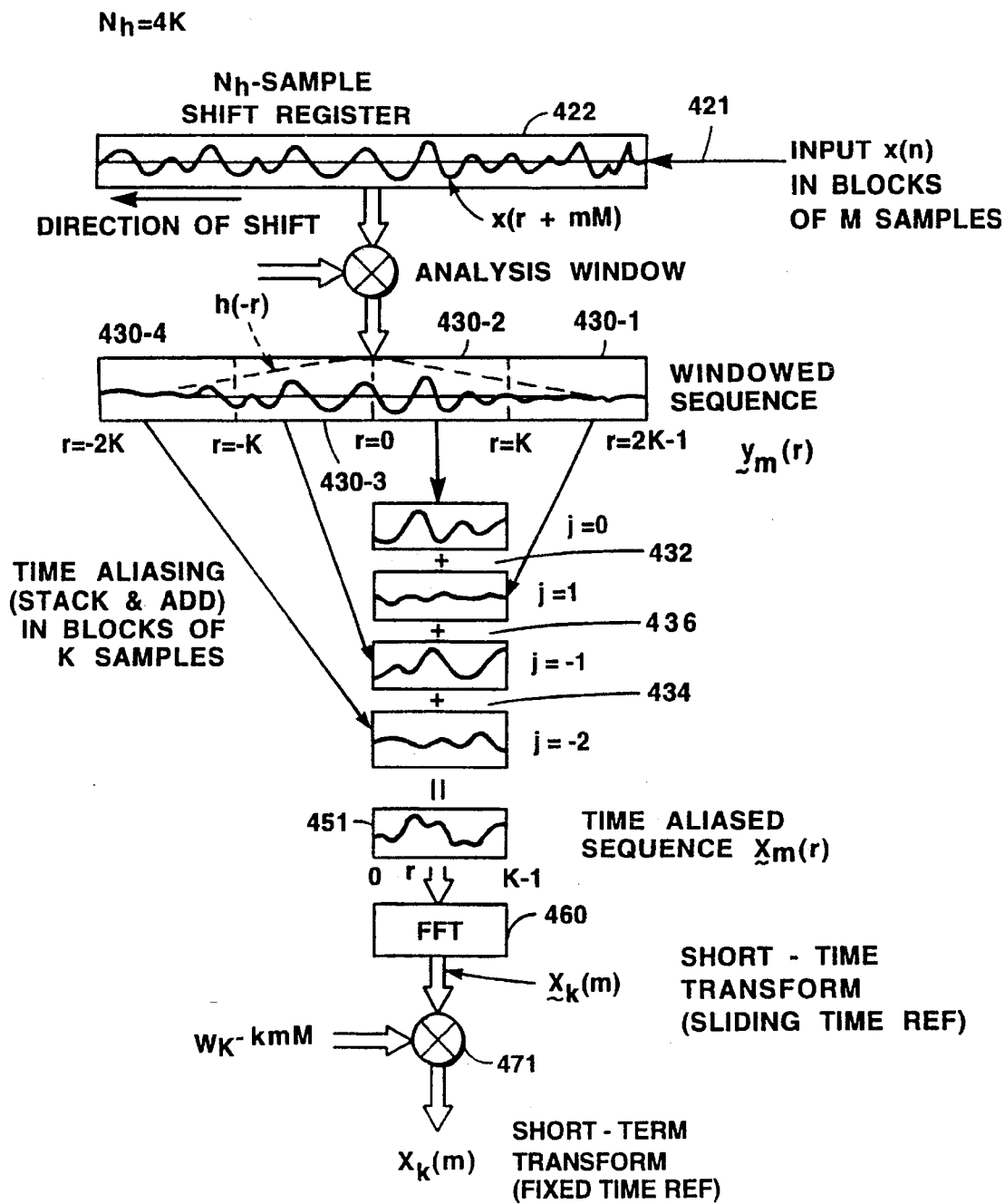
FIG. 6 is a conceptual diagram of the signal-processing mechanism executed by the overlap-and-add channelizer of FIGS. 4 through 4D to implement the filter bank of FIG. 5 and frequency-translate the results to baseband.

FIG. 6 illustrates the effect of forming these sums, which is to add coefficient-weighted K-element subsequences together to make a single (time-aliased) K-element is FFT input record. Forming these sums is the function of coefficient-multiplication circuit 420 of FIG. 4; its adders 432 (FIG. 4A), 434 (FIG. 4B), and 436 perform the above equation's inner summation, while multipliers 437 weight the input samples by the filter coefficients to produce that summation's addends. In turn, multipliers 437 receive their multiplicands from respective coefficient stores 435 and segments 431 of the shift register 422. A system controller (not shown) downloads the coefficients to the coefficient stores via the VMEbus 410 during initialization. As samples advance through the shift register, adder 436 serially produces, as the coefficient-multiplication circuit output, successive elements of the DFT input record. This input record is stored in an FFT-input memory 451.

The FFT operation requires a K-element-long input record, so each coefficient store 435 contains a respective K of the $N_h$=4K filter coefficients. But the FFT operation must be performed once every M samples, where M<K. In other words, the shift register 422 can advance by only M samples while the multiplication circuit must generate K FFT-input-record elements.

Figure 4A:
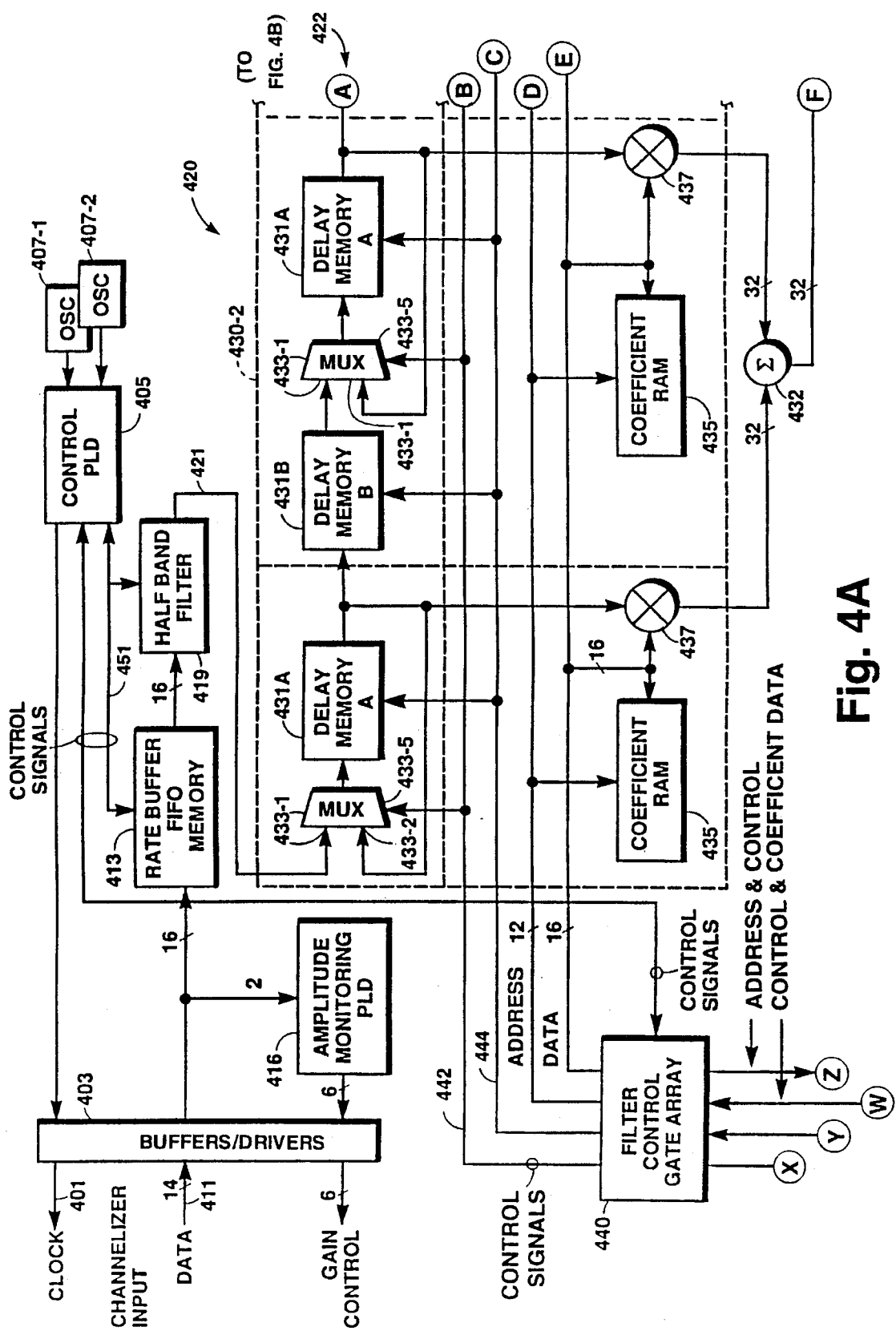
Figure 4B:
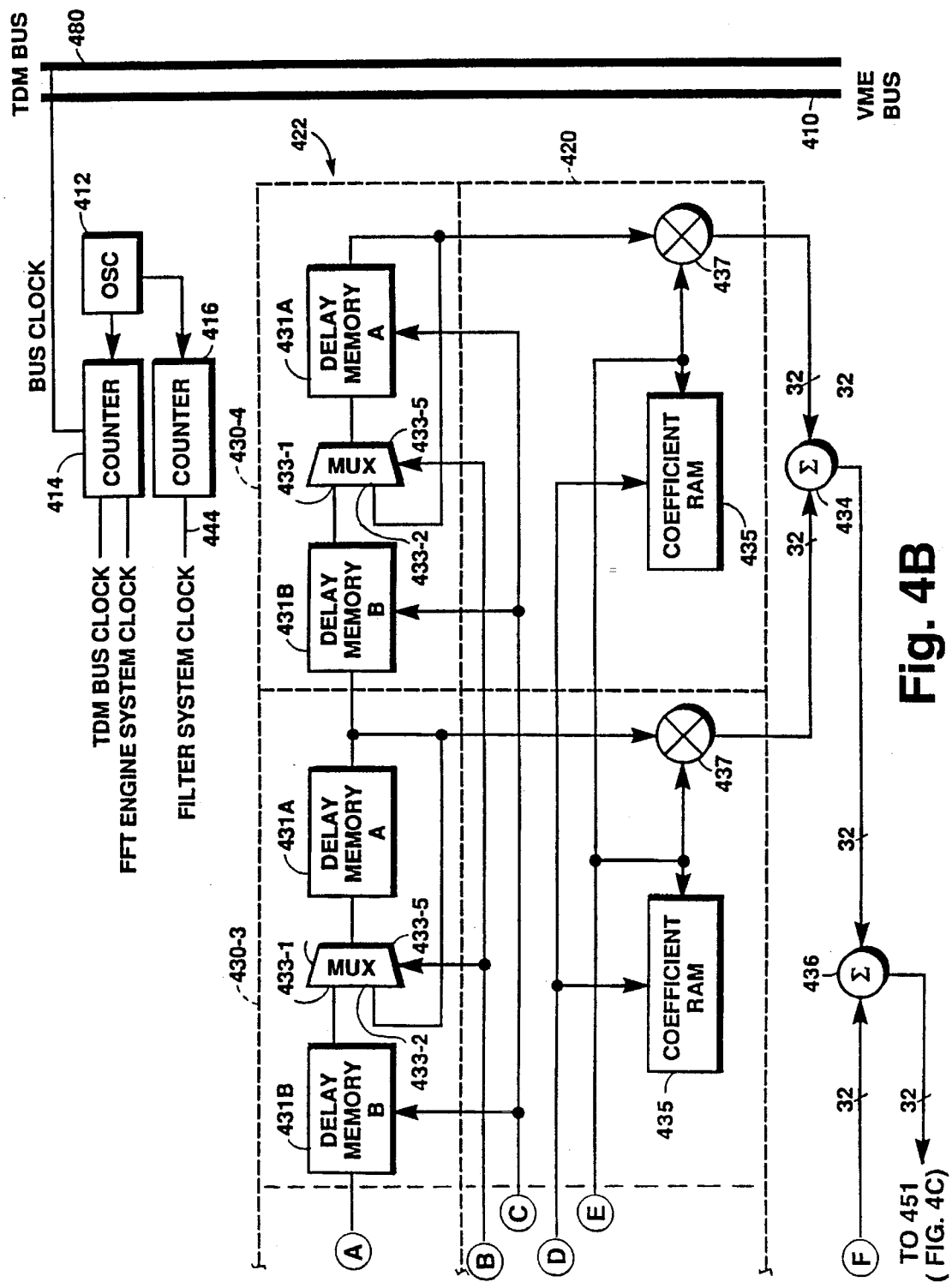
Figure 4D:
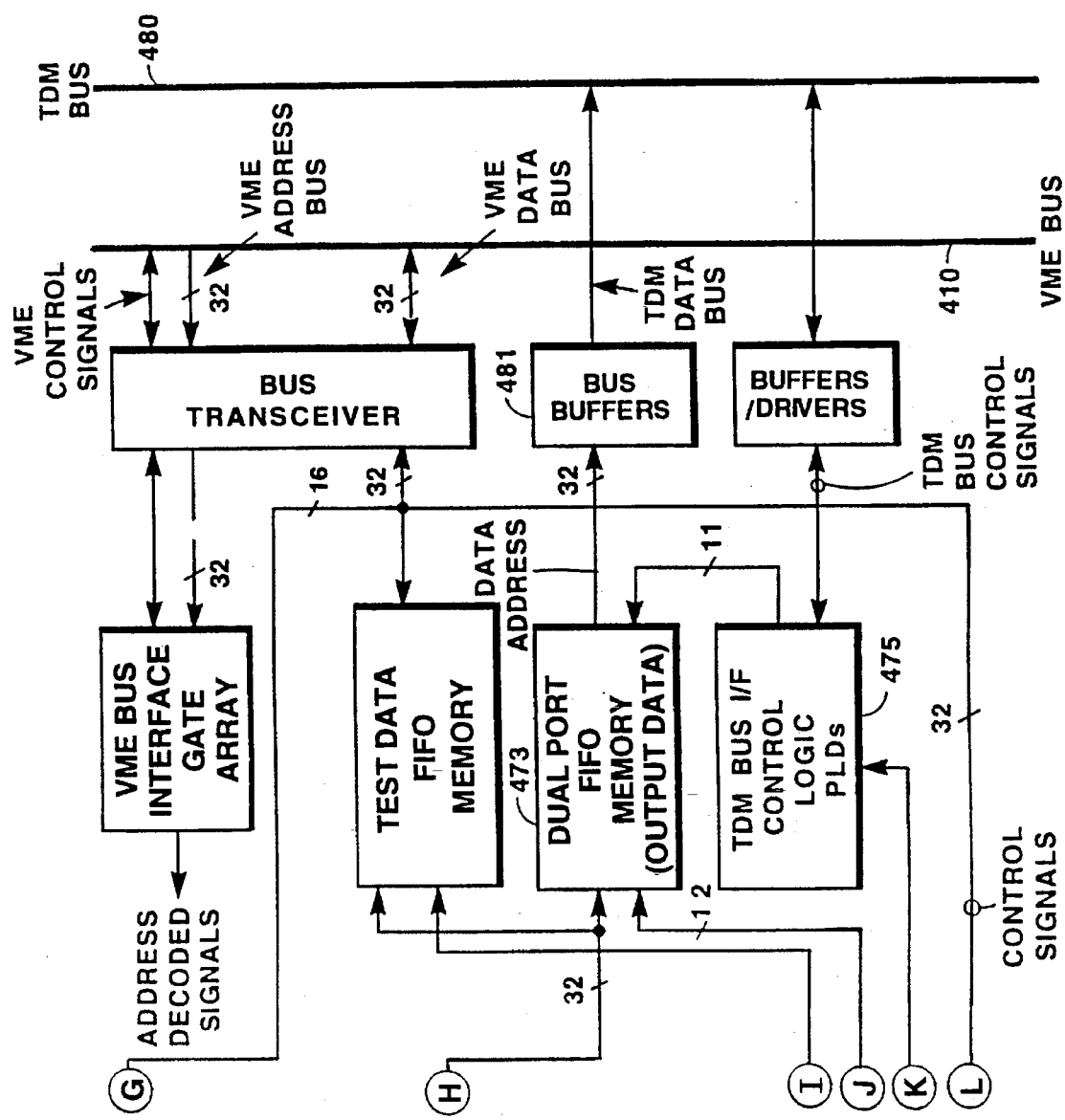

To see how the multiplier circuit 420 provides for this "overlap," consider the second filter-tap stage 430–2's delay memory 431A in FIG. 4A. Delay memory 431A does advance K values to its output port, and thus to multiplier 437, for each FFT input record. As it does so, however, the downstream memory 431B in FIG. 4B clocks in only the first M of memory 431A's K output samples, and the upstream memory 431B of FIG. 4A similarly supplies memory 431A replacement samples by way of a multiplexer 433 for only the first M output samples. After the first M output samples, multiplexer 433 changes state and feeds the next K-M samples back to the input port of memory 431A, which is K-M stages long. Consequently, the last K-M samples supplied from each K-sample subsequence for one FFT operation are the first K-M applied for the next.

A state-machine-implemented filter-control unit 440 (FIG. 4A) provides the control signals necessary for this sequencing. While coefficient-multiplier circuit 420 is producing the first M output values, unit 440 applies a select control signal over line 442 to the select input ports 433S of multiplexers 433 to select their upper ports 433-1. It also sends clock signals over line 444 to the delay memories 431 so that data shift from left to right during that time through each of the delay memories 431. For the remaining K-M samples, gate control unit 440 causes each multiplexer 433 to select its lower port 433-2 so that data are not clocked out of rate buffer memory 413 and data do not shift through the delay memories 431B. In other words, producing the coefficient multiplication circuit's last K-M values results in no shift of the overall shift-register contents, because only memories 431A are clocked, not memories 431B.

For the 30-kHz channelizer of the present example, a 512-point FFT with a 50-kHz channel sample rate must be produced every 20 microseconds. For a 200-kHz channelizer with a 300-kHz sample rate, a 64-point FFT must be generated every 3.333 microseconds.

Given these required channel sample rates and the fact that the coefficient-multiplication circuit 420 receives one complex sample for every two (real) input samples, the decimation rate M is computed as the integer nearest to half the ratio of the input sample rate to the channel sample rate. For the 30-kHz channelizer example, the decimation rate M is therefore $3.072 \times 10^7 \div 5 \times 10^4 \div 2 = 307$. For the 200-kHz channelizer example, the decimation rate M is $2.56 \times 10^7 \div 3 \times 10^5 \div 2 = 43$.

As pointed out above, input data are processed in blocks of M samples. To accommodate the size of the FFT processor, the samples are clocked out of FIFO 413 in bursts at a rate higher than the input-sample clock rate. And since the FFT size exceeds the decimation rate M, coefficient-multiplication circuit 420 must operate at a clock rate faster than one-half the input sample rate. Circuit 420's minimum clock rate is therefore K/2M times the input sample rate. This gives a minimum clock rate of 25.62 MHz for the 30-kHz channelizer and 19.05 MHz for the 200-kHz channelizer.

The computation values stored as a result in memory 451 are elements of a K-element sequence. This sequence is the sum of K-element subsequences of a filter-coefficient-weighted K-element input-sample sequence weighted by respective coefficients of a JK-long (low-pass) transversal filter. And as the preceding mathematical development demonstrated, each "bin" in the FFT operation's resultant output represents the output of a different-frequency filter in the filter bank that the channelizer implements.

Without more, the resultant DFT output elements $X_K[m]$ would simply be the outputs of the respective bandpass filters. That is, the channel contents would still modulate aliased images of the respective carrier frequencies. Obtaining the desired translation to baseband would require modulation of the kth DFT bin's output sequence by the complex sinusoid $W_K^{-kmM}$, as the multiplier at the bottom of FIG. 6 suggests. In other words, not only would each bin's output sequence have to be multiplied by a sequence representing a complex sinusoid, but the complex sinusoid would be different for each bin.

Theoretically, the computational burden of such an operation can be avoided by judiciously rotating the correspondence between transform input elements and the multiplication-circuit outputs (i.e., the outputs of FIG. 4B's adder 436) used as those elements, as the above-mentioned Crochiere et al. text indicates. This follows from the fact that a sequence's DFT differs from another's only by a relative phase advance if the two sequences differ only by a circular translation:

$$\mathfrak{I}\{x[((n-z))_K]\} = e^{-j2\pi kz/k} X[k],$$

where $\mathfrak{I}\{\}$ represents the discrete Fourier transform, $X[k]$ represents the discrete Fourier transform of $x[n]$, and $x[((n-z))_K]$ represents a modulo-K (circular) shift of the sequence $x[n]$ by z elements. So the desired output $X_k[m]$ can be achieved by circularly shifting the multiplier-output-to-DFT input correspondence before each DFT operation:

$$X_k[M] = \sum_{s=0}^{K-1} y_m[((s - mM))_k] W_K^{ks},$$

where $y_m[S]$ is the multiplier output.

Figure 7:
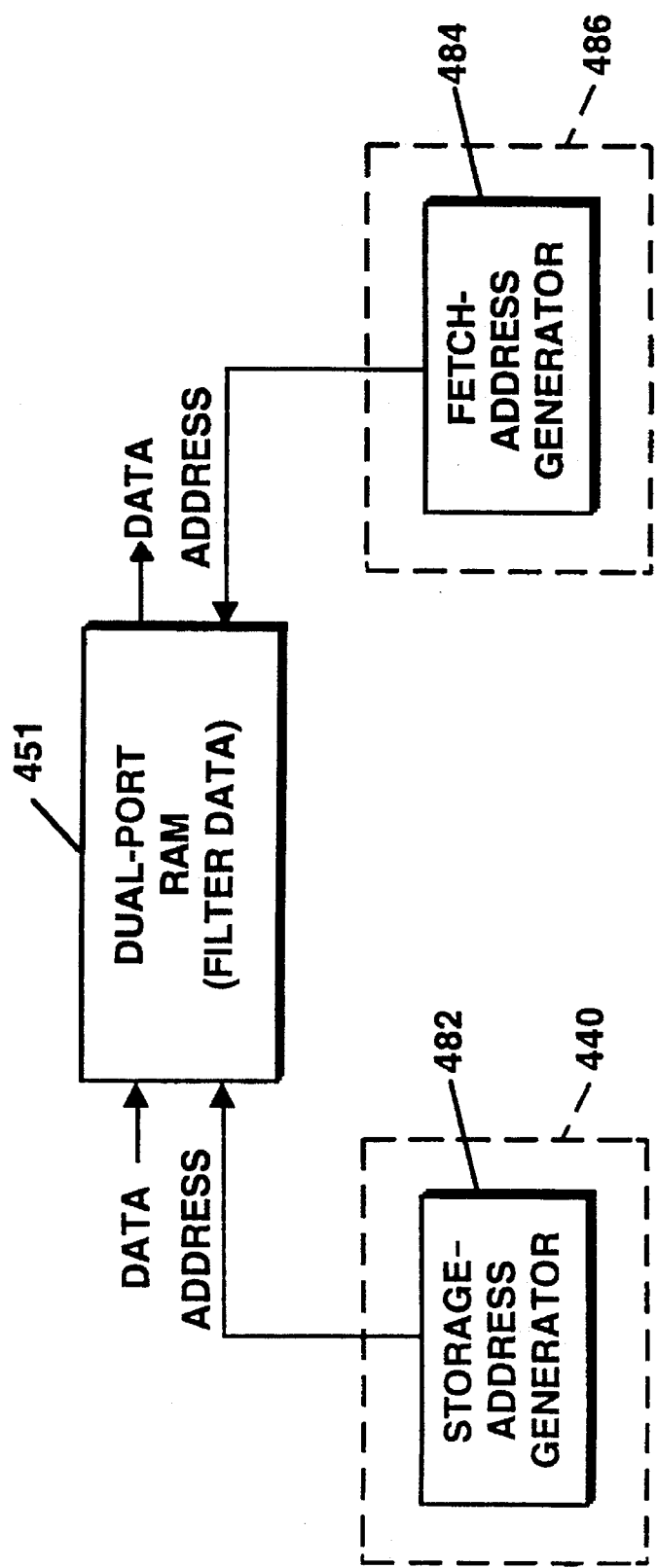
FIG. 7 diagrammatically depicts the addressing of a two-port memory employed in the channelizer of FIGS. 4–4D.

The present invention provides a practical way to implement such a shift. To store the successive elements of multiplication circuit 420's output sequence, the dual-port memory 451 receives memory addresses from a storage-address generator 482 (FIG. 7) in filter-control gate array 440. To fetch those computation values as successive DFT-input-record elements, memory 451 receives addresses from a fetch-address generator 484 in gate array 468.

Figure 8:
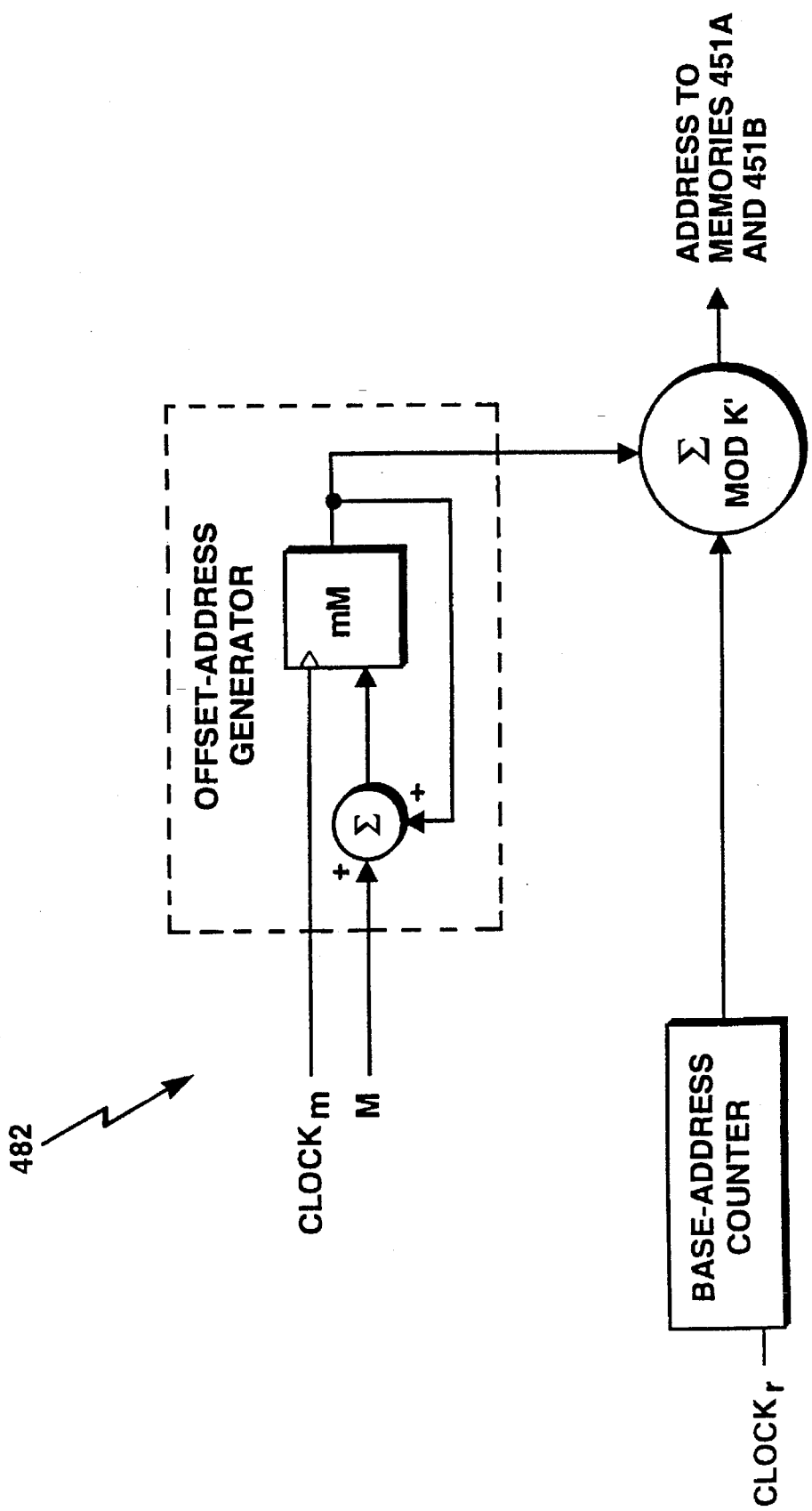
FIG. 8 is a more-detailed diagram of the fetch-address generator of FIG. 7.

The storage-address generator includes a base-address generator, which FIG. 8 depicts as a counter 486 clocked to produce the next base-address value for each new coefficient-multiplication-circuit output to be stored. It is a $\log_2 K$-width binary counter, and it starts with a count of zero at the beginning of each new FFT input record. According to the present invention, however, the storage address is the output of a modulo-K adder 488. This adder adds to the base address an offset-address generator 490's output, whose value progresses by M between FFT operations. As a consequence, the required shift is obtained simply by a modulo-K addition. This is because, in contrast to the storage addresses, the output of the fetch-address generator 484 (FIG. 7) in the illustrated embodiment is simply that of a base-address counter (not shown) similar to counter 486; i.e., the computation values used as given-index DFT input-record elements are always fetched from the same relative location.

In this example, in which the FFT input-record size K is a power of 2, the modulo-K adder is implemented simply as a $\log_2 K$-bit-wide adder; discarding overflows effects the modulo-K progression. In practice, the offset-address generator is simply a $\log_2 K$-bit-wide accumulator, although this is not necessary in principle.

Of course, the same effect can be achieved by switching the store- and fetch-address generators so that the starting fetch address is the one that progresses by M between FFT operations, although the offset address would then be decremented by M rather than incremented. Indeed, the starting addresses for storage and fetching can both rotate, so long as the algebraic sum of their offsets progresses by the decimation rate M between FFT operations.

FFT operations must be performed at the channel sample rate. For the 50-kHz channel sample rate, the 512-point FFT must be generated once very 20 microseconds, while the 64-point FFT generated for a 200-kHz channelizer with a 300-kHz sample rate must be generated every 3.333 microseconds. To achieve such a computation rate, we stagger the operation of three FFT processors 461, 462, and 463 similar to the Plessey PDSP 16515 A FFT Processor but modified as described in U.S. patent application Ser. No. 08/547,613 filed on Oct. 24, 1995, by Terry Lee Williams for an Improved-Accuracy Fast-Fourier-Transform Butterfly Circuit, which is hereby incorporated by reference. The FFT processors take turns performing successive FFT operations.

As was mentioned above, the address rotation of the present invention is typically superimposed on other address sequencing: the addresses generated by the FIG. 8 circuitry are relative. Since the multiplication circuit in the illustrated embodiment writes one FFT operation's input values into memory 451 while the FFT circuit is still reading out computation values for the previous one, for instance, it is preferable to alternate between two memory blocks within memory 451. Accordingly, the outputs of the storage- and fetch-address generators 482 and 484 may be added to further offsets to convert the relative location into the absolute address that selects the memory block to be used for the current FFT's input record. Alternatively, the base-address generator can be arranged to include that offset.

Also, memory 451 may comprise two separate, simultaneously addressable constituent memories 451A and 451B, as FIG. 4C indicates, and each would include two alternatively used memory blocks. The reason for using two constituent memories can be appreciated by considering computation of a 512-point FFT.

By depicting the base-address generator as a simple counter, we have tacitly assumed that signals representing the various computation values are to be applied to the FFT circuitry simply in their index order. And the Plessey FFT processor mentioned above is indeed arranged to accept computation values in that order. To illustrate a different sequencing, however, we will take part of the computation-value memory and part of the FFT processing out of the FFT engine 461 by computing a 512-point FFT.

The Plessey processor mentioned above employs a radix-4 butterfly operation. Since 512 is not a power of four, the 512-point DFT is computed by using two 256-point FFTs preceded by what is in essence a decimation-in-frequency radix-2 pass. Specifically, even bins of a K-point FFT are generated from a K/2-point FFT in accordance with:

$$X[2k] = \Im\{x[n] + x[n+K/2]\},$$

where $\{x[n]\}$ is the FFT's K-point input sequence, k is the FFT bin number, and X[k] is an FFT bin sample.

The following equation is employed for odd bins:

$$X[2k+1] = \Im\{(x[n] - x[n+K/2])W_K^{-n}\}.$$

So two 256-point FFT operations must be performed. In one 256-point FFT operation, each input computation value is the product, computed by a numerically controlled oscillator-modulator ("NCOM") 455, of (1) a complex-sinusoidal-sequence element and (2) the difference, computed by an arithmetic logic unit ("ALU"), between a respective pair of stored values. In the other 256-point FFT operation, each input computation value is the sum, computed by the ALU, of two of the stored values; the NCOM is disabled so as simply to forward that sum.

Figure 9:
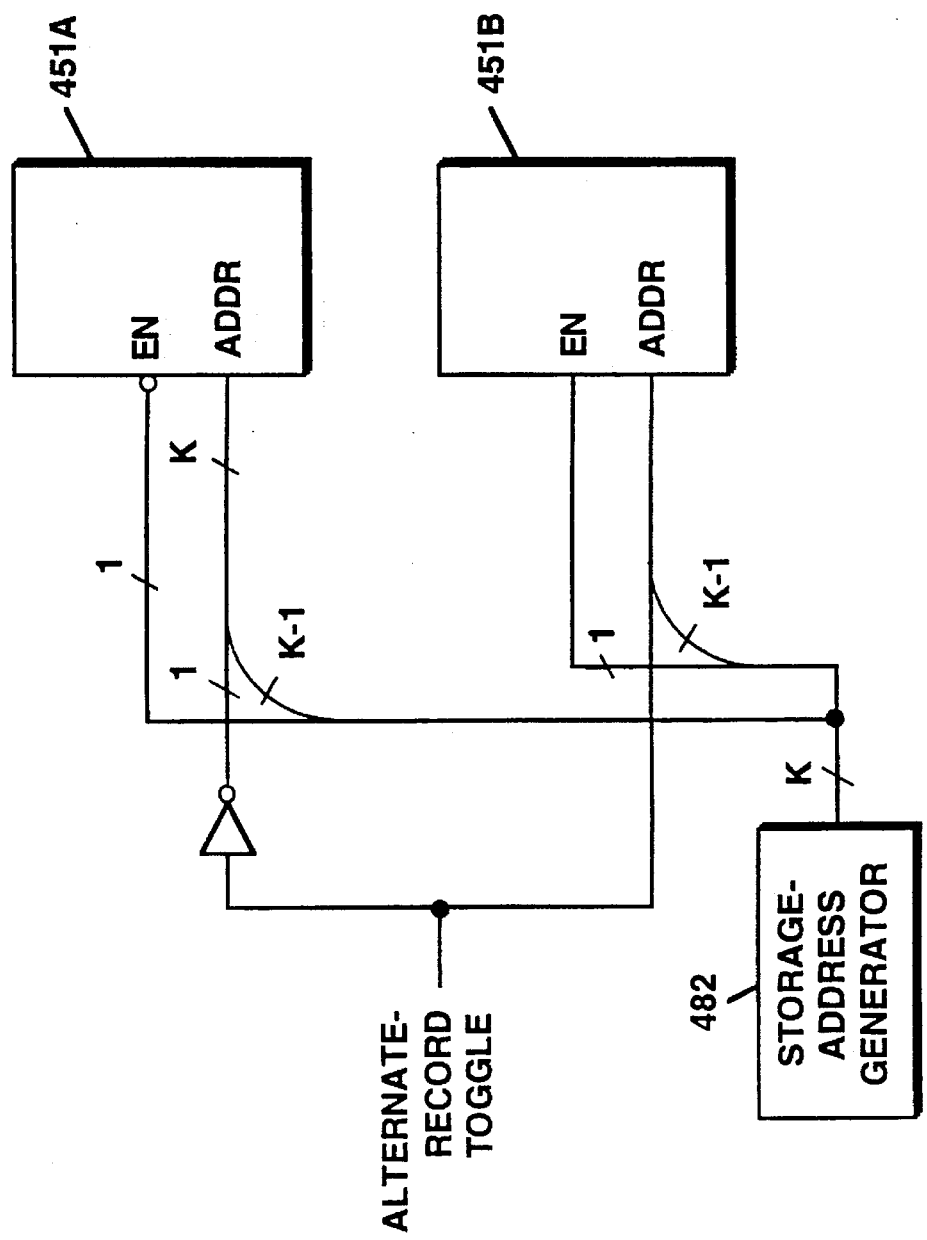
FIG. 9 is a diagram depicting another aspect of FIG. 7's addressing in more detail.

The ALU must therefore receive the pair of stored values simultaneously, so one constituent memory 451A holds the first K/2 values, and the other, simultaneously addressable constituent memory 451B holds the second K/2 values. The two constituent memories could be addressed as FIG. 9 illustrates. We assume that each constituent memory has 2K locations. One bit of the storage-address generator's output selects between the two constituent memories, while another part (not shown) of the filter-control gate array 440 (FIG. 4) uses a one-bit toggle signal to select between the address spaces to be used for alternate DFT input records.

Since the 200-kHz channelizer employs a 64-point FFT, it requires neither the ALU 453 nor the oscillator 455, so FFT control logic unit 468 disables them. (In practice, I have used a 256-point FFT to implement a 96-channel version of the 50-kHz channelizer, so I have actually omitted the NCOM and ALU.)

The FFT engine 460 employs a block-floating-point-algorithm: its output includes a (four-bit, in this case) scaling factor that is common to all the complex FFT output data. This scaling factor is fed to a scaling logic circuit 466 to control a barrel-shift circuit 470, which receives the FFT-engine output. Barrel-shift circuit 470 adjusts the data as they are read out from the FFT engines in order to align consecutive FFTs to the same scale. A dual-port RAM 473 stores the output of barrel-shift circuit 471.

Once dual-port RAM 473 (FIG. 4D) has received FFT-processed data for each channel (frequency bin), FFT control logic unit 468 signals an attendant time-division-multiplexed (TDM) bus-interface circuit 475 to assert the thus-computed channel samples onto TDM bus 480, from which processors 113 (FIG. 3) can receive them and extract the voice or other information that they contain.

The combiner 131 of FIG. 3 is essentially the mirror of the channelizer. The combiner's purpose is to frequency-division multiplex analytic baseband signals provided to it over the TDM bus by DSP processors 113 (FIG. 3). These processors modulate incoming voice or data signals from an attendant telephone network and format it (e.g., to a cellular standard). The combiner's output sequence is the sum of contributions from K channels, although certain "channels" represent no actual inputs to the system and their signal values are all zeros. The kth channel's contribution is the result of modulating a corresponding-frequency "carrier"complex-sinusoidal sequence $AW_K^{kn}$, where A is the carrier amplitude and samples occur at a rate M times that of the samples in the corresponding DSP output. The unmodulated complex carrier sequence $AW_K^{kn}$ can be thought of as a succession of overlapping wavelets that occur once every M samples:

$$AW_K^{kn} = \sum_m W_K^{kn} f(n - mM),$$

where $f[n]$ is proportional to a (real-valued) interpolation function. The modulation is a weighting of each wavelet by a corresponding channel sample $X_k[m]$, and a given channel's contribution results from adding these weighted wavelets together:

$$x_k[n] = \sum_m X_k[m]f[n - mM]W_K^{kn}.$$

I refer to $f[r]$ as an interpolation function because weighting the wavelets and adding them up in this fashion is equivalent to using a filter whose coefficients are proportional to the $f[n]$'s to interpolate M-1 values between successive $X_k[m]$ values and then multiplying the resultant interpolated sequence's values by corresponding values of the carrier.

Figure 5B:
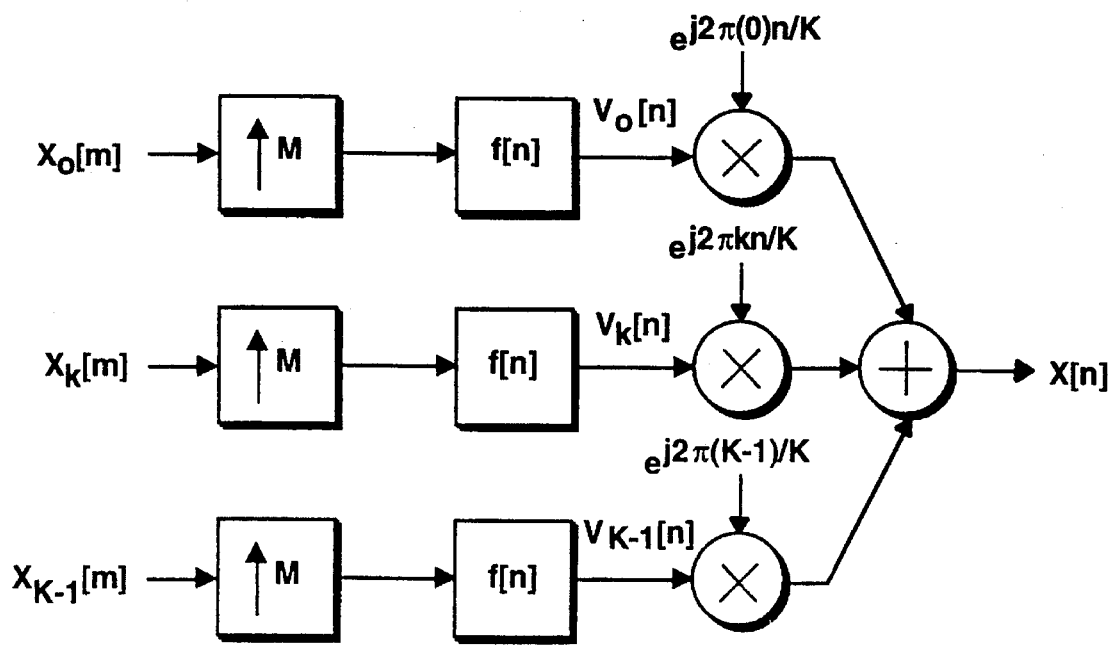

FIG. 5B depicts the this interpolation followed by generating the combiner output as the sum of these contributions, which is equivalent to summing the different-frequency wavelet trains:

$$\sum_{k=0}^{K-1} \sum_m X_k[m]f[n - mM]W_K^{kn},$$

where the outer summation is taken over the channels. Reversing the summation order and regrouping portrays the combiner output as a sum of successive overlapping modulated multi-frequency wavelets and reveals the inverse Fourier transformation in the process:

$$x[n] = \sum_m f[n - mM] \sum_{k=0}^{K-1} X_k[m]W_K^{kn}.$$

The inner summation clearly has the form of an inverse DFT $x_m[n]$. True, the index n takes on values outside the normal inverse-DFT range $0<n<K-1$, where K is the inverse DFT's input-record size. But if we observe that $W_K^{kn} = W_K^{k(n-lK)}$, where l is an integer, we see that it is appropriate to interpret the inverse-DFT element $x_m[n]$ for such out-of-domain n values as being given by $$x_m[n] = x_m[n - lk].$$

With this definition, we can conclude:

$$x[n] = \sum_m f[n - mM]x_m[n].$$

That is, the combiner output sequence x[n] is the sum of successive (periodically extended) inverse DFTs offset from each other by the interpolation rate M and weighted by the wavelet envelopes $f[n-mM]$.

Figure 10:
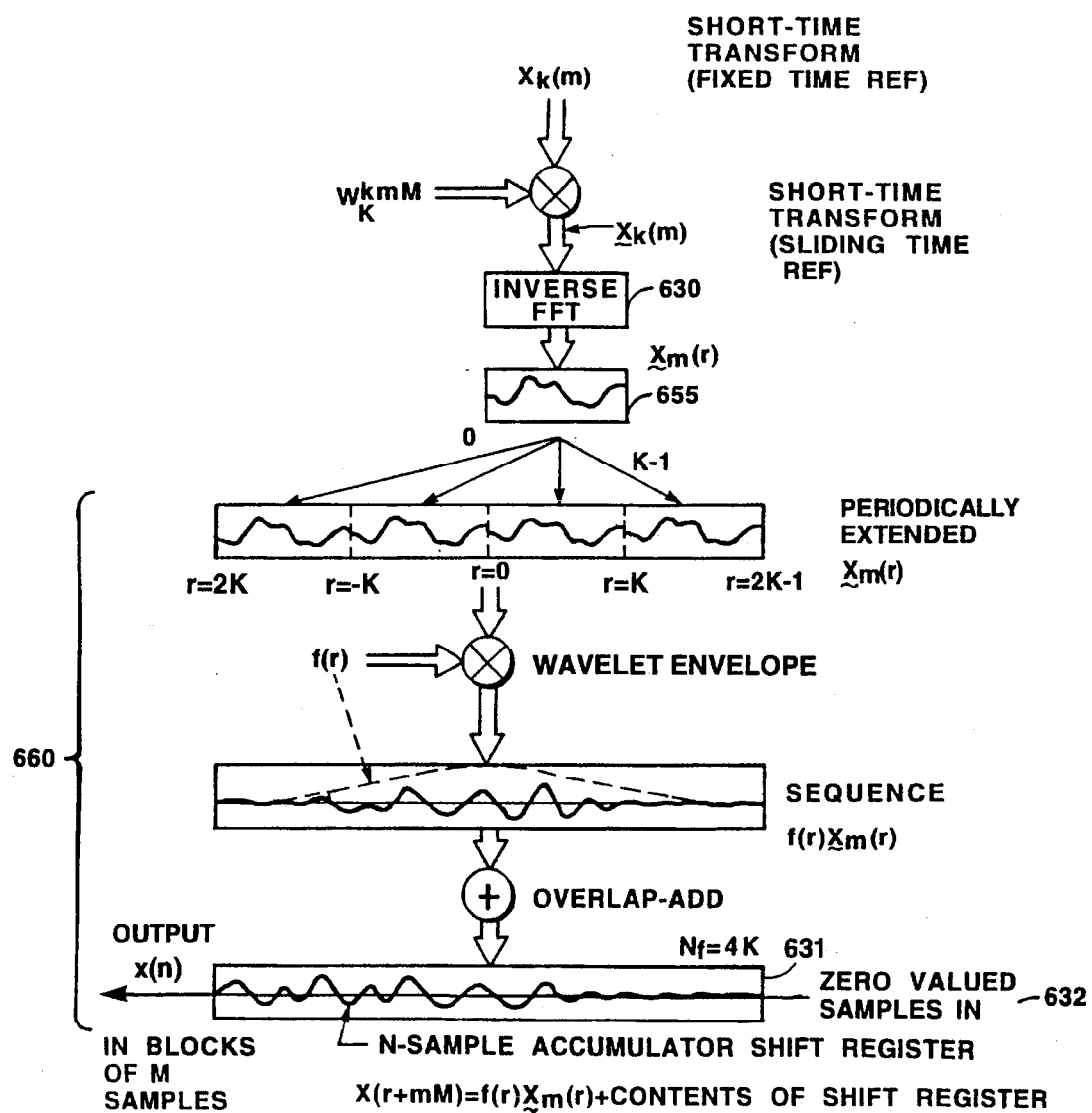
FIG. 10 is a conceptual diagram of the signal-processing mechanism executed by the overlap-and-add combiner of FIGS. 11–11D.

The lower left part of FIG. 10 shows that the combiner output sequence is adapted from the serial output of a shift register 631. The summation of the last equation is realized by, after every M output samples, adding to the shift register's contents the wavelet-envelope-weighted values of the most-recent inverse DFT. That is, successive sums of channel-value-modulated wavelets—i.e., successive multi-frequency wavelets—are added together with an M-sample offset.

But in the absence of an adjustment to be described presently, successive wavelets to be modulated for a given channel would be offset not only in time, as is desired, but also in phase, as is not: the unmodulated wavelets would not add up to a continuous carrier. At the top of FIG. 10, the phase adjustment necessary to eliminate this phase offset is depicted conceptually as a multiplication of $X_k[m]$ by a corresponding complex sinusoid. As the channelizer does, however, the combiner uses offset-address generators to avoid such multiplication. In the combiner, the address offsets rotate the correspondence between inverse-DFT elements and wavelet-envelope coefficients, as will be described below after a discussion of FIG. 11.

Figure 11:
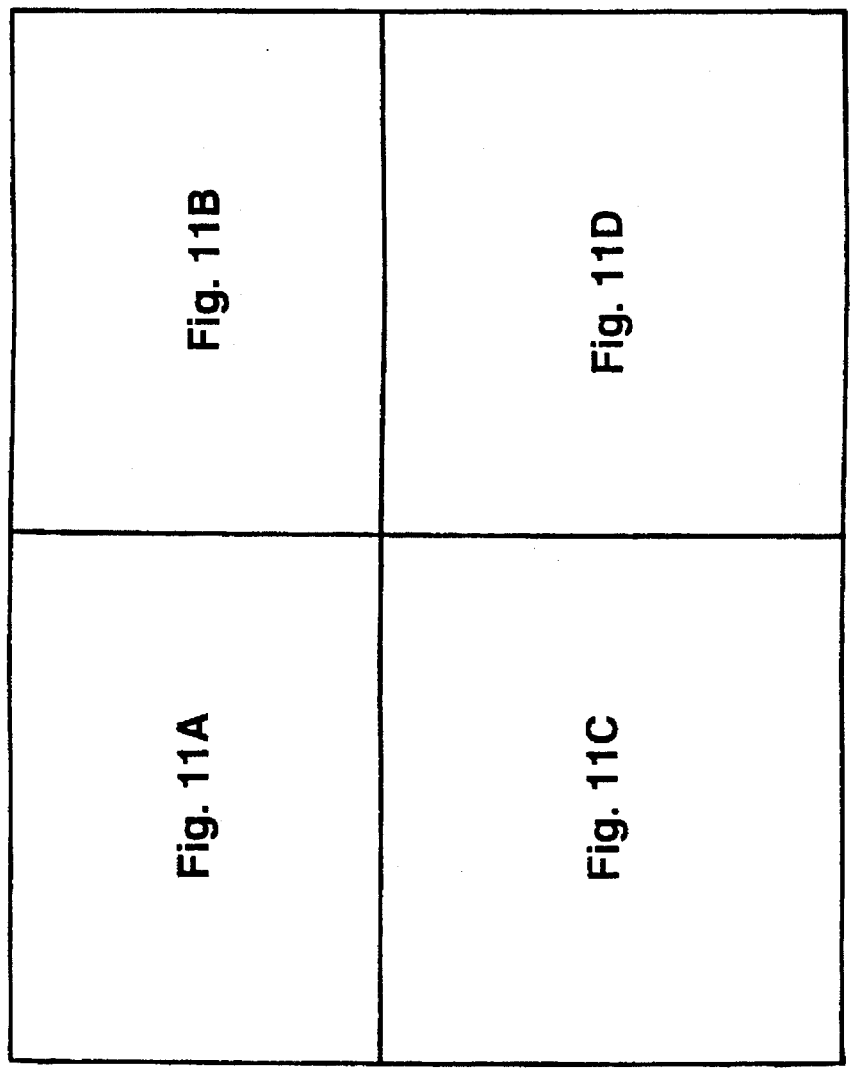
FIGS. 11, 11A, 11B, 11C, and 11D diagrammatically illustrate the signal-processing architecture of a multichannel overlap-and-add combiner for implementing the functions that FIG. 10 depicts.

The combiner of FIG. 11 embodies the FIG. 10 concept. It will be described for non-limitative examples of a 400-channel/30-kHz system that can be used in a NADC (TDMA) cellular system and of a 50-channel/200-kHz system that can be used with the European GSM cellular standard. For 30-kHz channels, a sample rate of 50 kHz is assumed. For 200 kHz, a 300-kHz sample rate is assumed. The combiner receives channelized data as analytic baseband signals.

Figure 11A:
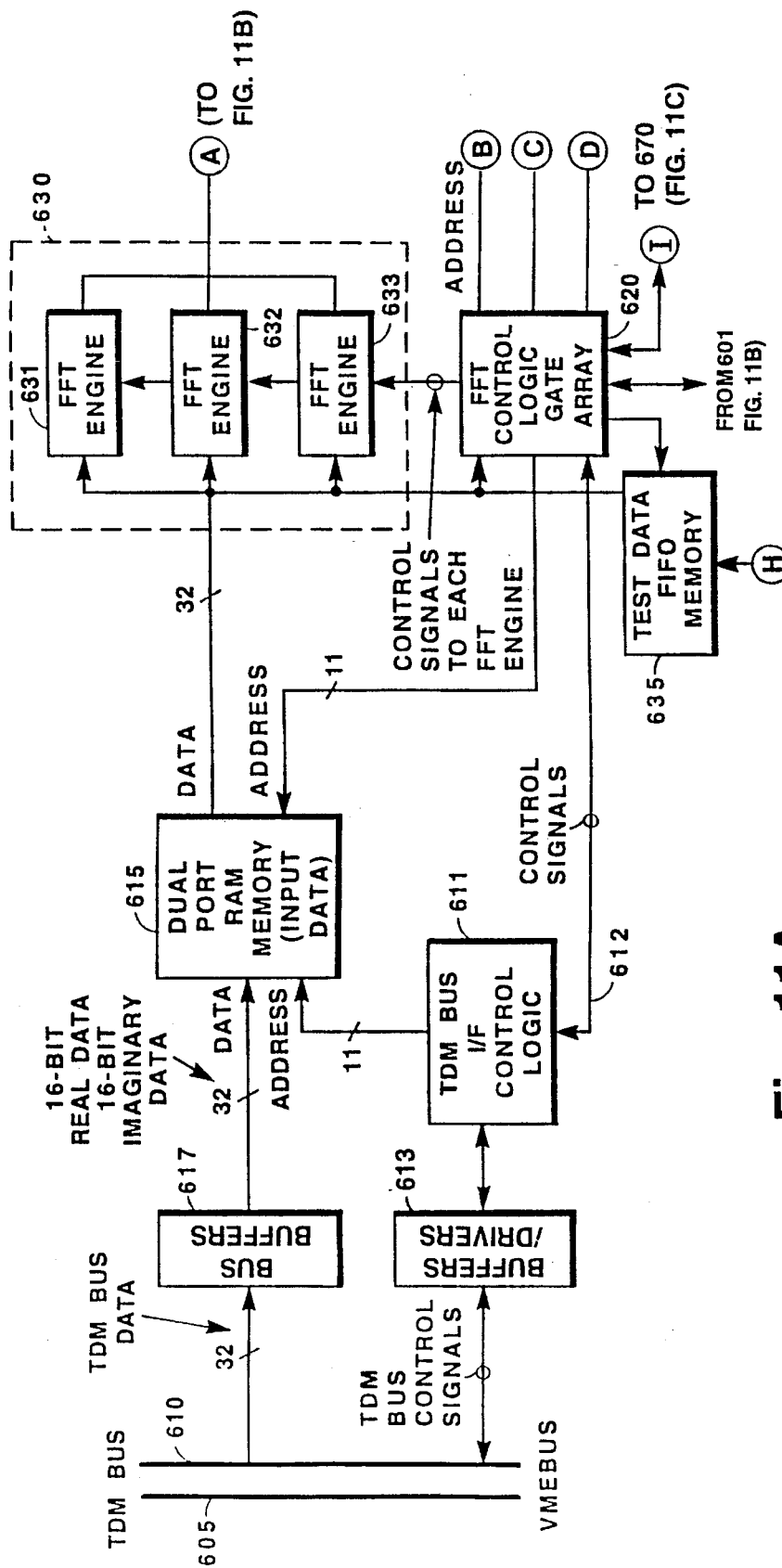
Figure 11B:
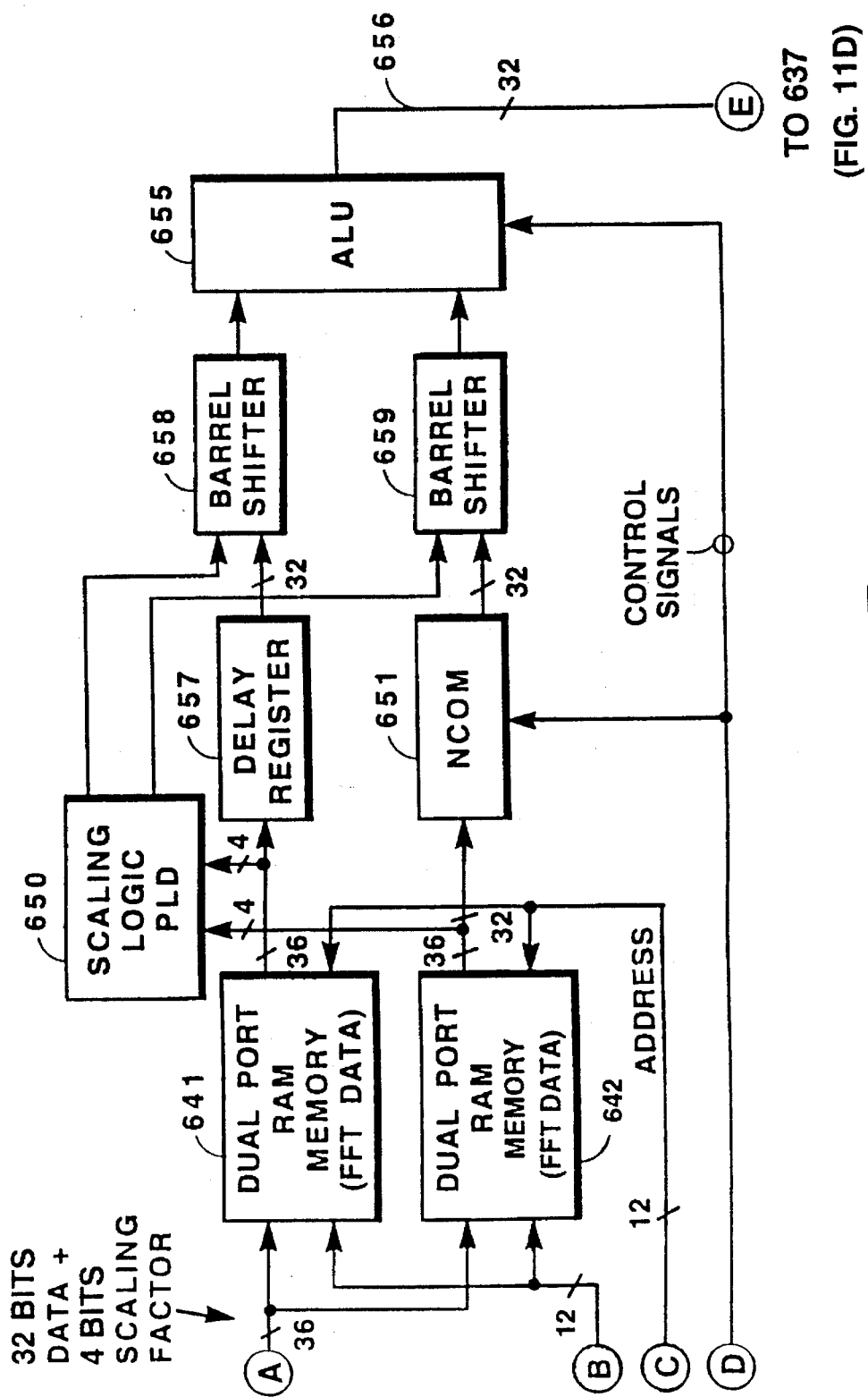
Figure 11C:
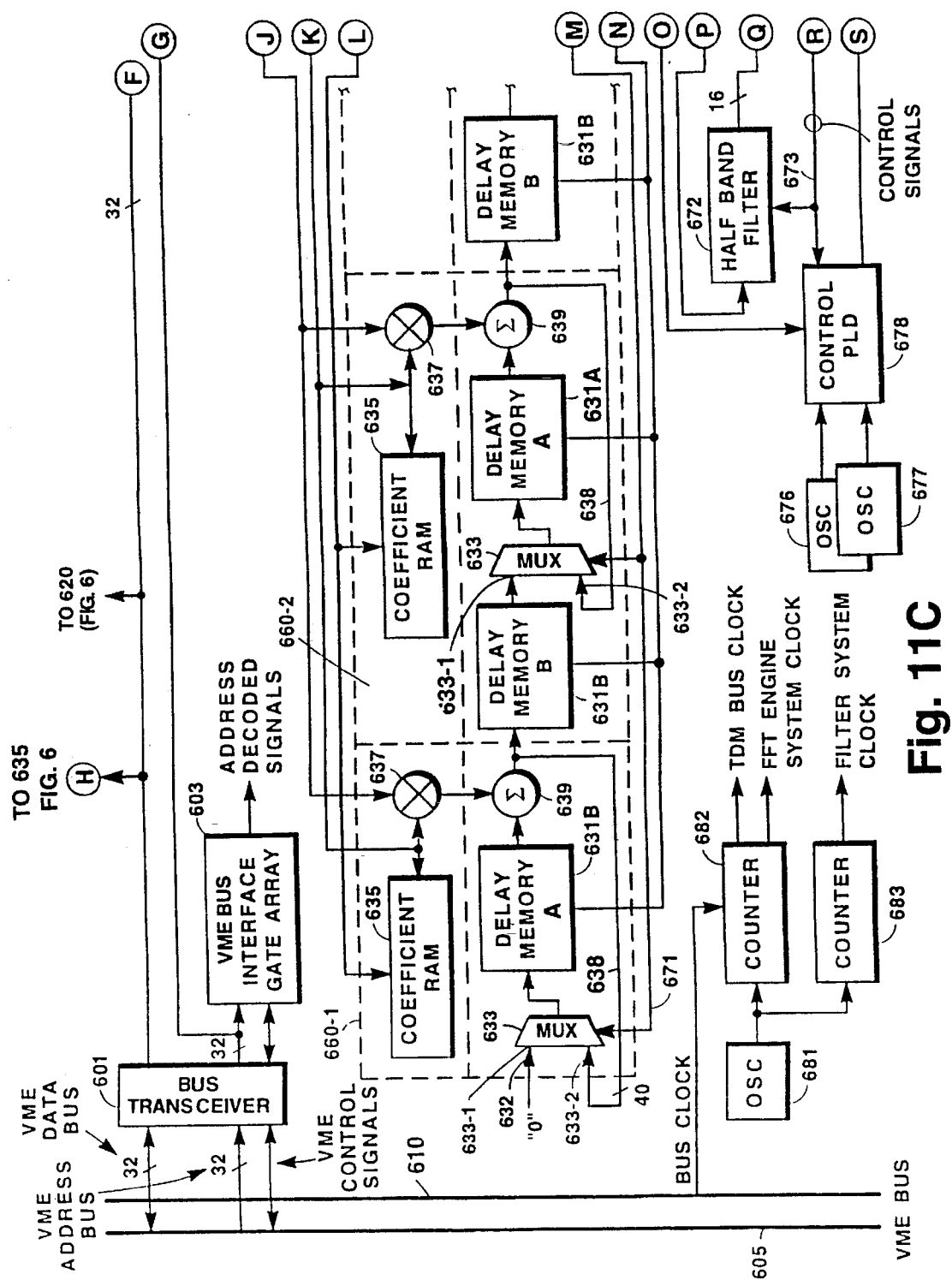
Figure 11D:
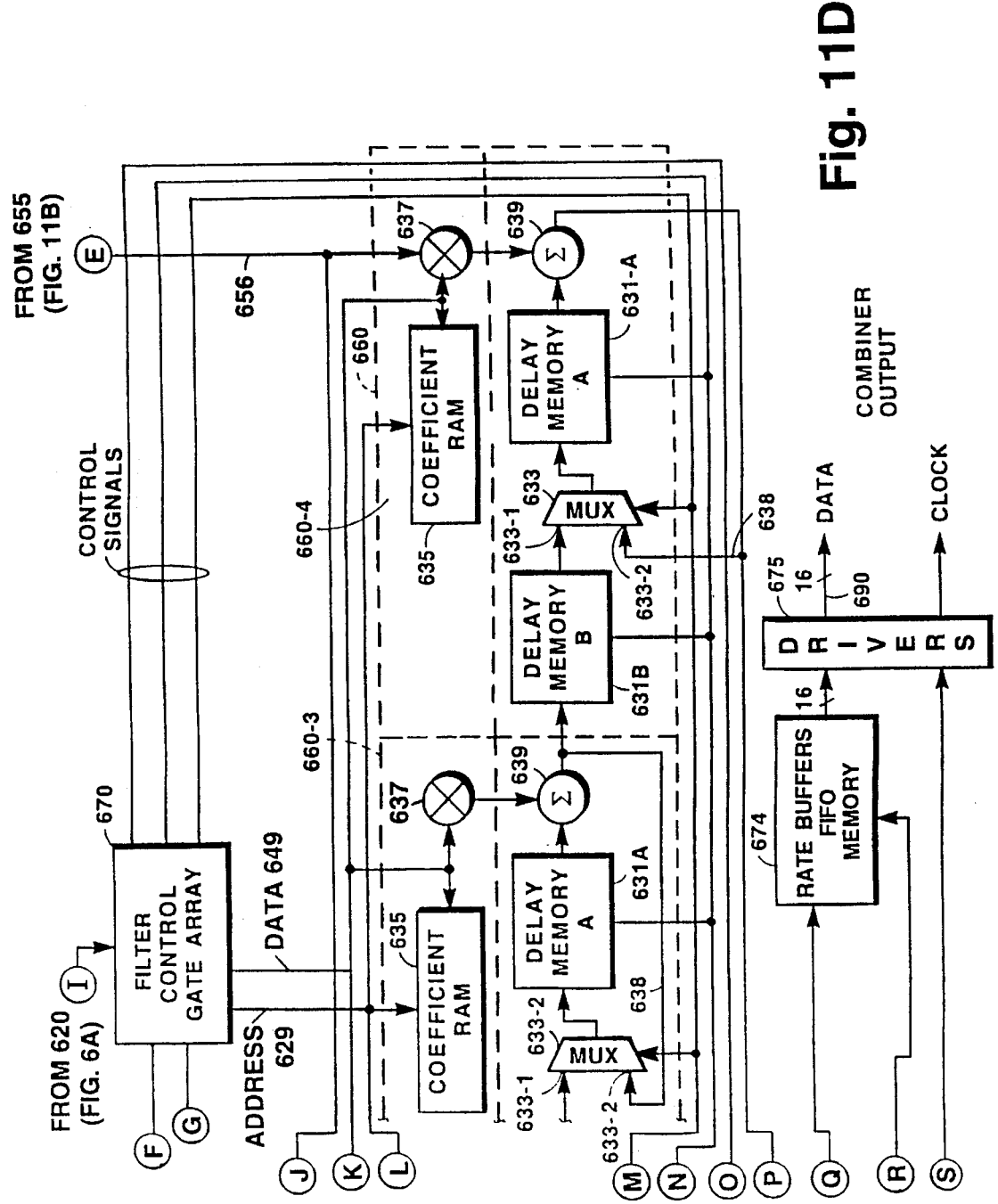

The shift register at the bottom of FIG. 10 is realized in delay memories 631A and 631B of FIGS. 11C and 11D. The combiner output, before conversion from complex to real, is the output of the rightmost adder 639 in FIG. 11D. These adders together perform the function represented by the adder at the bottom of FIG. 10. That is, they add the co-efficient-weighted elements of one inverse-DFT output record, with an M-element offset, to the results of similarly adding together previous inverse-DFT outputs.

Specifically, the inverse-DFT outputs appear serially on line 656 (FIG. 11D), and each is applied simultaneously to four multipliers 637, which multiply them by respective interpolation-filter coefficients from respective coefficient stores 635. Each of those coefficient stores contains K of the interpolation filter's 4K filter coefficients. The act of applying each output of the inverse DFT to four multipliers has the effect, depicted in FIG. 10, of periodically extending the inverse-DFT output to match the wavelet envelope's length.

Multiplexers 633 (FIGS. 11C and D) are instrumental in thus adding one envelope-weighted periodically-extended DFT output record for every M complex combiner outputs. Specifically, as the adders 639 add corresponding shift-register contents to the first M of the K coefficient-weighted outputs of each inverse-DFT output record, the output of the rightmost adder 639 is applied as the combiner output to a halfband filter 672. Filter 672 converts its complex input values to (twice as many) real values, which drivers 675 transmit after rate buffering in a memory 674. The other adders 639 apply their outputs to respective delay memories 631B, whose outputs the multiplexers simultaneously apply as inputs to delay memories 631A: the contents of the composite shift register as a whole are advanced, and the composite shift register has M values in each of its four K-element subsections 660-1 . . . 660-4 replaced with the sum of that element and a corresponding coefficient-weighted element of the periodically extended inverse-DFT output.

After receipt of the first M coefficient-weighted inverse-DFT elements, clocking of memory 631D stops so that the composite shift register stops advancing. But the contents of each K-M-stage delay memories 631A keep advancing. And the multiplexers 633 change state so that delay memories 631A's contents are replaced by the sum of their previous contents and corresponding coefficient-weighted inverse-DFT elements. Control circuitry 678 so operates halfband filter 672 and rate buffer 674 that they do not process the K-M values that the rightmost adder 639 generates during this period.

We now turn to the way in which the combiner generates the inverse-DFT sequences that appear on line 656 (FIG.

11D). TDM bus controller 611 (a logic-array-implemented state machine) and associated buffer/drivers 613 in FIG. 11A request a sample from each DSP by applying control signals to TDM bus 610. A bus buffer unit 617 writes these samples into a dual-port RAM buffer 615.

When the combiner has collected a sample from each of the operative channels, the TDM bus controller 611 applies control signals via link 612 to an FFT-control-logic unit 620, causing FFT control logic unit 620 to initiate FFT processing. Like the channelizer's logic gate array 468 (FIG. 4C), FFT-control-logic unit 620 is a state machine preferably implemented as a logic-gate array. Complementary to the forward-FFT-based channelizer of FIG. 4, the combiner of FIG. 11 employs an inverse FFT.

For computational convenience, the FFT processor, embodied in the dedicated radix-4 hardware 630 of FIG. 11A and the components of FIG. 11B, is configured to compute a DFT whose size is equal to the next power of two greater than the number of channels to be combined. So it performs a 512-point FFT for four hundred 30-kHz channels, and it performs a 64-point FFT for fifty 200-kHz channels. FFT size is programmed into the FFT engines during initialization. The FFT operations occur at the channel sample rate; the input record comprises a single sample from each channel, together with enough zeros to reach the next power of two.

For the four-hundred-channel version, for instance, control logic unit 620 supplies zeros for the first and last 56 FFT bins. For the middle 400 bins, data for the active channels come from dual-port RAM 615, while inactive channels' bins receive zeros. For the fifty-channel version, zeros are written into the first and last seven FFT bin as well as those of the remaining fifty bins that correspond to inactive channels. Active-channel contents fill the other bins. The active channels' identities are programmed into control logic unit 620 during system initialization.

For test purposes, the system controller can program FFT control logic unit 620 to read data for specific bins from FIFO memory 635, which is dedicated to this test capability. Memory 635 is coupled to bus 605 via transceiver unit 601 (FIG. 11C) so as to allow a CPU on the VMEbus to write a test signal to the combiner.

Since inverse-DFT computations differ from those for a forward DFT only in the signs of the complex sinusoids' real parts-or, alternatively, only in the selection of input elements upon which various operations are performed-FFT hardware is usually arranged to be operable in either mode. (Theoretically, there is also a scale-factor difference, but typical FFT hardware does not implement it.) Alternatively, forward-only hardware can be used for an inverse DFT by externally taking advantage of the following identity:

$$x[n]=K \cdot f\{X[((-k))_K])\},$$

where x[n] is the inverse FFT of X[k], n=sample number, k is the FFT-bin index, K is the FFT size, and {X[((-k))K]} is {X[k]} reversed in order, modulo K. By so reversing the input computation values as to generate this mirror of the FFT-engine input data about bin 0, one can cause the forward-FFT circuitry to calculate an (FFT-size-scaled) inverse FFT. The following description will therefore use the terms FFT and DFT generically to refer both to forward and to inverse FFT and DFT operations.

To use radix-4 FFT engines to generate a 512-point FFT, the combiner of FIG. 11 first generates two 256-point FFTs and combines them. That is, the FIG. 11 arrangement uses the decimation-in-time approach:

$$X[k]=G[k]+H[k]W_K^{-k},$$

where X[k] is a K-point FFT of an input sequence x[n], k is the FFT-bin index, K is the FFT size, G[k] is the K/2-point FFT of the even samples of x[n], and H[k] is the K/2-point FFT of the odd samples of x[n].

Accordingly, the FFT-control-logic unit 620 of FIG. 11A first causes dual-port RAM 616 to fetch and apply to the FFT processor 630 a 256-point input record comprising the 512-point input record's even values. The FFT processor 630 computes that record's inverse DFT and stores the resultant computation values in the upper dual-port RAM 641 of FIG. 11B: RAM 641 stores G[k]. FFT-control-logic unit 620 (FIG. 11A) then causes RAM 615 to fetch the odd-indexed values whose inverse DFT the FFT processor 630 computes and stores in the lower RAM 642 of FIG. 11B: RAM 642 stores H[k].

A numerically controlled oscillator-modulator (NCOM) 651 multiplies H[k] by $W_K^{-k}$. To compute the first 256 bins of a 512-point FFT, an arithmetic logic unit (ALU) 655 adds G[k] to $H[h]W_K^{-k}$. Since $W_K^k=-W_K^{k-K/2}$ for k=256 to 511, the ALU takes the differences of the same value pairs to compute the remaining 256 bins of the 512-point FFT. To accommodate the propagation delay through NCOM 651 and ensure that ALU 655 processes the proper pair of samples, a set of delay registers 657 is interposed between dual-port RAM 641 and the ALU. For the 200-kHz channels, a 64-point FFT can be used, so no radix-2 pass is necessary, and NCOM 651, dual-port RAM 642, and ALU 655 can be eliminated or disabled by control signals from control unit 620.

As noted earlier, the FFT engines employ a block-floating point algorithm, which yields a common scale factor for all of a given FFT operation's output values. Since the two 256-point FFTs used to generate a 512-point FFT may not have the same scaling factor, and consecutive FFTs may have the different scaling factors, barrel shifters 658 and 659 scale the output computation values.

We now return to the discussion of how the combiner reorders the computation values so as effectively to phase-align the wavelets. The phase-adjustment effect of the multiplier at the top of FIG. 10 can instead be achieved by rotating FFT computation values in a manner similar to that in which the channelizer performs such a rotation. To demonstrate some of the present invention's scope, however, we have arranged the illustrated channelizer to perform the rotation between FFT passes.

As is well known to those skilled in the art, the essence of the FFT algorithm is to perform the overall DFT by way of a plurality of constituent DFTs and thereby reduce the computational burden that would result from a straightforward application of the DFT definition. Calculating a 64-point DFT by way of a radix-4 algorithm, for instance, comprises (1) a first pass that involves performing sixteen radix-4 butterfly operations, i.e., calculating sixteen "twiddle-factor"-modified four-point DFTs in which the input computation values are the overall-DFT input values, (2) a second pass that involves performing radix-4 butterfly operations in which the computation values are those produced in the first pass, and (3) a third pass that involves performing radix-4 butterfly operations in which the computation values are those produced in the second pass.

The illustrated embodiment performs a 512-point FFT operation in five passes. The radix-4 FFT processor 630 of FIG. 11A performs the first four, radix-four passes, while the NCOM and ALU of FIG. 11B perform the last, radix-2 pass, i.e., one in which 256 DFTs are calculated on the results of the fourth pass (as modified by "twiddle factors" in the NCOM) to obtain the overall-DFT results. As was mentioned above, however, the first four passes can also be viewed as two 256-point DFTs; memory 641 (FIG. 11B) stores the output of one, and memory 642 stores the output of the other. A result is that the desired rotation in the 512-point overall-FFT output can be accomplished by rotating the constituent 256-point DFTs' outputs individually.

Figure 12:
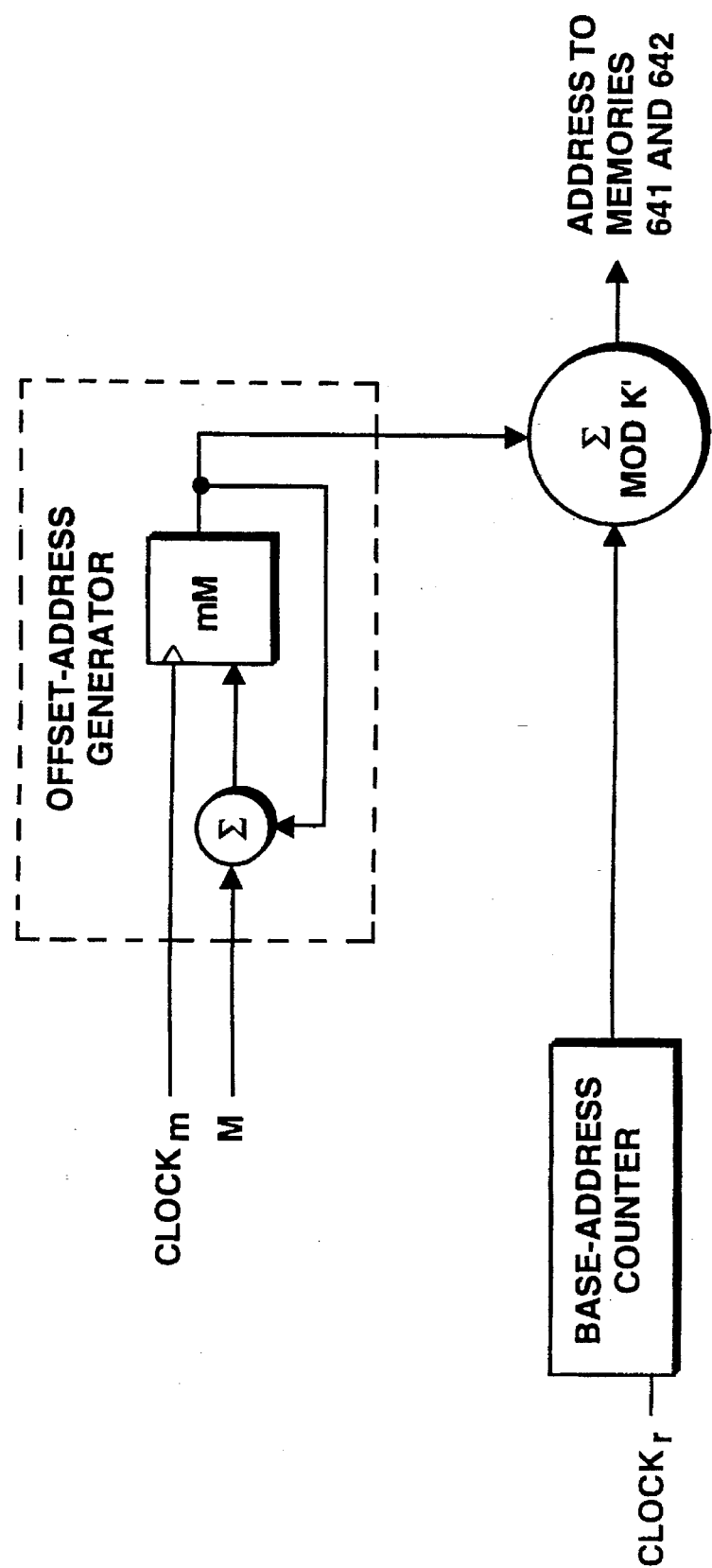
FIG. 12 diagrammatically illustrates the addressing employed in the combiner of FIG. 12.

Specifically, the desired rotation can be achieved if the FFT-control-logic gate array 620 of FIG. 11A includes an address generator of the type generally depicted in FIG. 12 for addressing the memories 641 and 642. For the 512-point FFT operation just described, the circuit of FIG. 12 would differ from the fetch-address generator of FIG. 8 principally in that its adder is a modulo-256 adder, not a modulo-512 adder. (Typically, the base-address generator would also be modulo-256 counter rather than FIG. 8's typical modulo-512 counter, but those skilled in the art will recognize that this is not necessary.) For each 526-point FFT, the address generator sequences twice through the same 256-value address sequence before the offset progresses by M for the next 526-point FFT.

If the FIG. 12 address generator is used as the storage-address generator, the upper memory 641 uses the first occurrence of that 256-value address sequence to store the first 256-point DFT output, and the lower memory 642 uses that address sequence's second occurrence to store the second 256-point DFT output. If the FIG. 12 address generator functions as the fetch-address generator, on the other hand, memories 641 and 642 both use both occurrences of the 256-point address sequence. The NCOM 651 and ALU 655 use the resultant fetched computation values during the address sequence's first occurrence to generate one output of each of the 256 radix-2 operations, and they generate those radix-2 operations' other outputs during the address sequence's second occurrence.

More generally, the adder used to add the progressing offset for a K-point overall FFT operation can have a modulus K'=K/J, where J is a positive integer, in arrangements in which the effect of rotating the overall DFT's outputs (or inputs) is achieved by instead individually rotating constituent DFTs' computation values. For instance, if the ALU and NCOM of FIG. 11A instead performed decimation-in-time radix-4 butterfly operations on the outputs of four constituent 16-point DFTs to produce 64-point-overall-FFT outputs, a modulo-16 adder could be used in the respective 16-point DFT memories' address generator; in that case, J would be four.

It is therefore apparent that the present invention can be implemented in a wide range of embodiments and thus constitutes a significant advance in the art.

What is claimed is:

1. A wideband cellular-telephone-receiver circuit for receiving a composite signal comprising a plurality of different-frequency carriers modulated by respective modulation signals and for extracting a plurality of channel output signals representing respective ones of the modulation signals, the receiver circuit comprising:

A) a digitizing circuit for processing the composite signal to produce digital-sequence signals representing a digital input sample sequence;

B) a discrete-Fourier-transform circuit for performing a sequence of overall Fourier-transform operations, each overall Fourier-transform operation comprising constituent Fourier-transform computations executed in successive passes through respective passes' computation values to compute as computation values of the last pass the discrete Fourier transform of a K-element transform input record consisting of computation values of the first pass, where K=JK' and J, K, and K' are positive integers, and for generating a plurality of channel output signals, each of which represents corresponding elements of discrete Fourier transforms computed in successive overall Fourier-transform operations;

C) a coefficient-multiplication circuit for receiving successive input-sequence segments of the input sample sequence, each input-sequence segment being offset from the previous segment by M samples, where M is a non-zero integer, for multiplying the elements of each input-sequence segment by corresponding coefficients of a base finite-impulse-response filter and so time-aliasing the products as to produce the computation values of the first pass, and for generating multiplication-circuit output signals representing those transform-input-record elements, whereby each channel signal is indicative of the response, to the input-sequence segment, of a respective finite-impulse-response filter whose frequency response is that of the base finite-impulse-response filter translated by a respective different frequency offset;

D) memory circuitry, comprising addressable memory locations, for receiving memory address signals representing addresses for respective computation values, receiving the computation values, and, between uses thereof, storing the computation values in and fetching the computation values from memory locations designated by the memory-address signals; and E) address-generation circuitry, including address-computation circuitry for determining the memory addresses to be used for storing and fetching respective computation values for each pass, for generating and applying to the memory circuitry memory-address signals representing those memory addresses, the circuitry for generating the addresses for storing or fetching one pass's computation values comprising:

i) a base-address generator for generating, for each computation value, base-address signals representing a base address that is the same in successive overall Fourier-transform operations for corresponding elements of corresponding passes;

ii) a modulo-K' adder, responsive to the base-address signals and adapted to receive offset-address signals, for computing, as the relative memory address for each of the computation values of that pass in a given overall Fourier-transform operation, the sum, modulo K', of the base address for that computation value and the offset address for that overall Fourier-transform operation; and iii) an offset-address generator for generating and applying to the modulo-K' adder, for each overall Fourier-transform operation, an offset-address signal representing a quantity that so progresses between successive overall Fourier-transform operations that each channel signal represents the output of its respective finite-impulse-response filter translated to a common frequency band.

2. A wideband cellular-telephone-receiver circuit as defined in claim 1 wherein the modulo-K' adder is a $\log_2 K'$-bit adder.

3. A wideband cellular-telephone-receiver circuit as defined in claim 1 wherein the base-address generator is a $\log_2 K'$-bit counter.

4. A wideband cellular-telephone-receiver circuit as defined in claim 1 wherein the offset-address generator is a $\log_2 K'$-bit accumulator.

5. A wideband cellular-telephone-receiver circuit as defined in claim 1 wherein the base-address generator, modulo-K' adder, and offset-address generator are included in the circuitry for generating addresses for storing one pass's computation values, and the circuitry for generating the addresses for fetching that pass's computation values generates and applies to the memory circuitry memory-address signals representing, for each computation value, a base address that is the same in successive overall Fourier-transform operations for corresponding elements of corresponding passes.

6. A wideband cellular-telephone-receiver circuit as defined in claim 5 wherein the quantity represented by the offset address progresses by M between successive overall Fourier-transform operations.

7. A wideband cellular-telephone-receiver circuit as defined in claim 6 wherein J=1.

8. A wideband cellular-telephone-receiver circuit as defined in claim 5 wherein J=1.

9. A wideband cellular-telephone-receiver circuit as defined in claim 1 wherein the base-address generator, modulo-K' adder, and offset-address generator are included in the circuitry for generating addresses for fetching one pass's computation values, and the circuitry for generating the addresses for storing that pass's computation values generates and applies to the memory circuitry memory-address signals representing, for each computation value, a base address that is the same in successive overall Fourier-transform operations for corresponding elements of corresponding passes.

10. A wideband cellular-telephone-receiver circuit as defined in claim 9 wherein the quantity represented by the offset address progresses by M between successive Fourier-transform operations.

11. A wideband cellular-telephone-receiver circuit as defined in claim 10 wherein J=1.

12. A wideband cellular-telephone-receiver circuit as defined in claim 9 wherein J=1.

13. For receiving digital channel signals and transmitting a radio signal representative of the channel signals' contents, a cellular-telephone transmitter circuit comprising:

A) a discrete-Fourier-transform circuit for receiving respective digital channel signals that together represent a set of channel-signal sequences associated with respective channels and thereby also represent a sequence of ensembles of corresponding elements from all of the channel-signal sequences and for computing each ensemble's inverse discrete Fourier transform by using that ensemble's elements as computation values in an initial pass of an overall Fourier-transform operation comprising constituent Fourier-transform computations executed in successive passes through respective passes' computation values to compute as computation values of the last pass the discrete Fourier transform of a K-element transform input record consisting of transform computation values of the first pass, where K=JK' and J, K, and K' are positive integers;

B) a coefficient-multiplication circuit for periodically extending each inverse discrete Fourier transform computed by the discrete-Fourier-transform circuit, multiplying the result by an envelope sequence to produce a multifrequency-wavelet sequence, computing an output sequence representing the result of adding the multifrequency-wavelet sequence with an M-element offset to a sequence resulting from similarly adding together previous multifrequency-wavelet sequences, and generating a combiner output signal representative of the output sequence;

C) transmission circuitry, responsive to the combiner signal, for transmitting a radio signal representative thereof;

D) memory circuitry, comprising addressable memory locations, for receiving memory address signals representing addresses for respective computation values, receiving the computation values, and, between uses thereof, storing the computation values in and fetching the computation values from memory locations designated by the memory-address signals; and E) address-generation circuitry, including address-computation circuitry for determining the memory addresses to be used for storing and fetching respective computation values for each pass, for generating and applying to the memory circuitry memory-address signals representing those memory addresses, the circuitry for generating the addresses for storing or fetching one pass's computation values comprising:

i) a base-address generator for generating, for each computation value, base-address signals representing a base address that is the same in successive overall Fourier-transform operations for corresponding elements of corresponding passes;

ii) a modulo-K' adder, responsive to the base-address signals and adapted to receive offset-address signals, for computing, as the relative memory address for each of the computation values of that pass in a given overall Fourier-transform operation, the sum, modulo K', of the base address for that computation value and the offset address for that overall Fourier-transform operation; and iii) an offset-address generator for generating and applying to the modulo-K' adder, for each overall Fourier-transform operation, an offset-address signal representing a quantity that so progresses between successive overall Fourier-transform operations that the combiner output signal represents the result of frequency-translating each channel signal into a different frequency band and adding the frequency-translated signals together.

14. A wideband cellular-telephone-transmitter circuit as defined in claim 13 wherein the modulo-K' adder is a $\log_2 K'$-bit adder.

15. A wideband cellular-telephone-transmitter circuit as defined in claim 13 wherein the base-address generator is a $\log_2 K'$-bit counter.

16. A wideband cellular-telephone-transmitter circuit as defined in claim 13 wherein the offset-address generator is a $\log_2 K'$-bit accumulator.

17. A wideband cellular-telephone-transmitter circuit as defined in claim 13 wherein the base-address generator, modulo-K' adder, and offset-address generator are included in the circuitry for generating addresses for storing one pass's computation values, and the circuitry for generating the addresses for fetching that pass's computation values generates and applies to the memory circuitry memory-address signals representing, for each computation value, a base address that is the same in successive overall Fourier-transform operations for corresponding elements of corresponding passes.

18. A wideband cellular-telephone-transmitter circuit as defined in claim 17 wherein the quantity represented by the offset address progresses by M between successive overall Fourier-transform operations.

19. A wideband cellular-telephone-transmitter circuit as defined in claim 18 wherein J=1.

20. A wideband cellular-telephone-transmitter circuit as defined in claim 17 wherein J=1.

21. A wideband cellular-telephone-transmitter circuit as defined in claim 13 wherein the base-address generator, modulo-K' adder, and offset-address generator are included in the circuitry for generating addresses for fetching one pass's computation values, and the circuitry for generating the addresses for storing that pass's computation values generates and applies to the memory circuitry memory-address signals representing, for each computation value, a base address that is the same in successive overall Fourier-transform operations for corresponding elements of corresponding passes.

22. A wideband cellular-telephone-transmitter circuit as defined in claim 21 wherein the quantity represented by the offset address progresses by M between successive Fourier-transform operations.

23. A wideband cellular-telephone-transmitter circuit as defined in claim 22 wherein J=1.

24. A wideband cellular-telephone-transmitter circuit as defined in claim 23 wherein J=1.

* * * * *